(12) United States Patent
Sze To

(10) Patent No.: US 12,427,464 B2
(45) Date of Patent: Sep. 30, 2025

(54) AIR FILTRATION SYSTEMS AND METHODS OF FORMING AN AIR FILTRATION SYSTEM

(71) Applicant: Aurabeat Technology Limited, Hong Kong (CN)

(72) Inventor: Gin Nam Sze To, Hong Kong (CN)

(73) Assignee: Aurabeat Technology Limited, New Territories (CN)

( * ) Notice: Subject to any disclaimer, the term of this patent is extended or adjusted under 35 U.S.C. 154(b) by 600 days.

(21) Appl. No.: 17/322,646

(22) Filed: May 17, 2021

(65) Prior Publication Data

US 2021/0394104 A1 Dec. 23, 2021

Related U.S. Application Data

(63) Continuation of application No. PCT/CN2021/078131, filed on Feb. 26, 2021.

(30) Foreign Application Priority Data

Jun. 19, 2020 (CN) .......................... 202010568220.X

(51) Int. Cl.
   *B01D 46/00* (2022.01)
   *B01D 39/20* (2006.01)

(52) U.S. Cl.
   CPC ..... *B01D 46/0028* (2013.01); *B01D 39/2027* (2013.01); *B01D 2239/0414* (2013.01);
   (Continued)

(58) Field of Classification Search
   CPC ............ B01D 46/0028; B01D 39/2027; B01D 2239/0414; B01D 2239/0442; B01D 2239/0478; B01D 2239/065
   (Continued)

(56) References Cited

U.S. PATENT DOCUMENTS 5,840,245 A * 11/1998 Coombs ............. B01D 46/0028
   422/4
2006/0042209 A1* 3/2006 Dallas ................. B01D 46/527
   55/524
(Continued)

FOREIGN PATENT DOCUMENTS

CN 1454695 A 11/2003
CN 1816280 A 8/2006
(Continued)

OTHER PUBLICATIONS

Office Action dated Nov. 17, 2022 in connection with Japanese Patent Application No. 1776.
(Continued)

*Primary Examiner* — T. Bennett McKenzie
(74) *Attorney, Agent, or Firm* — Baker & McKenzie LLP

(57) ABSTRACT

Embodiments relate to systems and methods for forming an air filtration system. The system includes an air filter. The air filter includes a plurality of filtration surfaces, including a first outer filtration surface, a second outer filtration surface opposite to the first outer filtration surface, and one or more inner filtration surfaces provided between the first and second outer filtration surfaces. The plurality of filtration surfaces may be configured to trap one or more airborne particulates, including viruses and/or bacteria. The air filtration assembly further includes a disinfectant coating. The disinfectant coating is formed on at least a portion of the plurality of filtration surfaces. The disinfectant coating may be for use in disinfecting trapped airborne particulates. The disinfectant coating includes a performance layer. The performance layer includes metal ions. The disinfectant coating further includes an enhancement layer. The enhancement layer includes carbonates.

11 Claims, 11 Drawing Sheets

(52) U.S. Cl.
CPC ............... *B01D 2239/0442* (2013.01); *B01D 2239/0478* (2013.01); *B01D 2239/065* (2013.01)

(58) Field of Classification Search
USPC ........................................................ 95/285
See application file for complete search history.

(56) References Cited

U.S. PATENT DOCUMENTS

| | | | |
|---|---|---|---|
| 2007/0295334 A1 | 12/2007 | Nonomura | |
| 2008/0241505 A1* | 10/2008 | Kobori | B01J 20/324 428/317.1 |
| 2014/0346396 A1* | 11/2014 | Michalakos | B01D 53/82 96/108 |
| 2016/0296871 A1* | 10/2016 | Scope | B01D 46/0028 |
| 2016/0360745 A1 | 12/2016 | Johnston et al. | |
| 2018/0243674 A1* | 8/2018 | Gulrez | B01D 39/1623 |
| 2019/0329171 A1 | 10/2019 | Kanno | |
| 2021/0394104 A1 | 12/2021 | Sze To | |

FOREIGN PATENT DOCUMENTS

| | | | | |
|---|---|---|---|---|
| CN | 101293107 | A | | 10/2008 |
| CN | 102078634 | A | | 6/2011 |
| CN | 202538514 | U | | 11/2012 |
| CN | 103866561 | A | | 6/2014 |
| CN | 103891778 | A | | 7/2014 |
| CN | 104147847 | A | | 11/2014 |
| CN | 204017537 | U | | 12/2014 |
| CN | 106621590 | A | | 5/2017 |
| CN | 107213789 | A | | 9/2017 |
| CN | 107469614 | A | | 12/2017 |
| CN | 107551673 | A | | 1/2018 |
| CN | 107694223 | A | | 2/2018 |
| CN | 107789209 | A | | 3/2018 |
| CN | 109046008 | A | | 12/2018 |
| CN | 110358382 | A | | 10/2019 |
| CN | 111227362 | A | | 6/2020 |
| CN | 111686514 | A * | 9/2020 | ............. B01D 39/14 |
| DE | 4208243 | C1 * | 7/1993 | ............. F24F 3/1603 |
| EP | 1499564 | A1 | | 1/2005 |
| EP | 1596960 | A1 | | 11/2005 |
| EP | 3958997 | A1 | | 3/2022 |
| JP | 48055871 | A2 | | 8/1973 |
| JP | 2005-007346 | A | | 1/2005 |
| JP | 2006247403 | A | | 9/2006 |
| KR | 20100075456 | A | | 7/2010 |
| KR | 20160121254 | A | | 10/2016 |
| KR | 20170108250 | A | | 9/2017 |
| KR | 20190044296 | A | | 4/2019 |
| KR | 20200042594 | A | | 4/2020 |
| WO | 2015104894 | A1 | | 7/2015 |
| WO | 2015125942 | A1 | | 8/2015 |
| WO | 2017029482 | A1 | | 2/2017 |
| WO | 2019007642 | A1 | | 1/2019 |
| WO | 2019053037 | A1 | | 3/2019 |
| WO | 2021253866 | A1 | | 12/2021 |

OTHER PUBLICATIONS

Preliminary Rejection (First Office Action) dated Aug. 29, 2023 in connection with Korean Patent Application No. 10-2021-7030057, 17 pages.
First Office Action dated Jun. 29, 2021 in connection with Chinese Application No. 202010568220.X, 12 pages.
International Search Report and Written Opinion dated May 27, 2021 in connection with International Application No. PCT/CN2021/078131, 9 pages.
Office Action dated Sep. 15, 2022 in connection with Chinese Patent Application No. 202180002534.6, 13 pages.
Examiners Report dated Aug. 4, 2022 in connection with Canadian Patent Application No. 3130280, 3 pages.
Supplementary European Search Report dated May 23, 2023 in connection with European Patent Application No. 21805826.1, 9 pages.

* cited by examiner

AIR FILTRATION SYSTEMS AND METHODS OF FORMING AN AIR FILTRATION SYSTEM

CROSS-REFERENCE TO RELATED APPLICATIONS

This application is a continuation of and claims priority to PCT Application No. PCT/CN2021/078131 filed Feb. 26, 2021, which claims priority to Chinese Patent Application No. 202010568220.X filed Jun. 19, 2020. The contents from all of the above are hereby incorporated in their entirety by reference.

TECHNICAL FIELD

The present disclosure relates generally to systems and methods for the filtration of air and other gases, and more specifically, to air filtration systems and methods of forming an air filtration system.

BACKGROUND

Air filters are an essential part of an air filtration device. Air filters are typically designed to filter out small particulates from the air, thereby purifying the air. Air filters are used in a variety of applications, including air conditioning systems (e.g., central air conditioning systems, individual residential air conditioning units, vehicle air conditioning systems), air filtration systems, etc.

BRIEF SUMMARY

Microbiological airborne particulates, such as bacteria, fungi and viruses (e.g., the COVID-19 virus), have become increasingly widespread and dangerous over the years. While conventional air filters can remove small airborne particulates from the air, certain airborne bacteria and viruses can remain harmful (e.g., remain infectious) for extended periods of time. In this regard, harmful airborne bacteria and viruses that are trapped, captured, and/or attached to air filters may, for a variety of reasons, become untrapped, uncaptured, and/or detached from the air filters and re-enter the air.

The present disclosure relates generally to systems, subsystems, methods, and processes for addressing conventional problems, including those described above and in the present disclosure, and more specifically, example embodiments relate to systems, subsystems, methods, and processes for the treatment, disinfection, purification, sanitization, or the like of air, other gases, vapors, condensates, precipitates, and/or other mediums, including the destruction, denaturation, decomposing, and/or rendering harmless of airborne particulates, impurities, or the like (including harmful viruses and/or bacteria).

In an exemplary embodiment, an air filtration assembly is described. The air filtration assembly includes an air filter. The air filter includes a plurality of filtration surfaces, including a first outer filtration surface, a second outer filtration surface opposite to the first outer filtration surface, and one or more inner filtration surfaces provided between the first and second outer filtration surfaces. The plurality of filtration surfaces may be configured to trap one or more airborne particulates, including viruses and/or bacteria. The air filtration assembly further includes a disinfectant coating. The disinfectant coating is formed on at least a portion of one or more of the plurality of filtration surfaces. The disinfectant coating may be for use in disinfecting trapped microbiological airborne particulates. The disinfectant coating includes a performance layer. The performance layer includes metal ions. The disinfectant coating further includes an enhancement layer. The enhancement layer includes carbonates.

In another exemplary embodiment, an air filtration assembly is described. The air filtration assembly includes an air filter. The air filter includes a plurality of filtration surfaces, including a first outer filtration surface, a second outer filtration surface opposite to the first outer filtration surface, and one or more inner filtration surfaces provided between the first and second outer filtration surfaces. The plurality of filtration surfaces may be configured to trap one or more airborne particulates, including viruses and/or bacteria. The air filtration assembly further includes a disinfectant coating. The disinfectant coating is formed on the air filter. The disinfectant coating includes metal ions and carbonates. The disinfectant coating includes between about 0.00001 to 0.5 $g/m^2$ of metal ions, or the like. The disinfectant coating includes between about 0.0001 to 50 $g/m^2$ of carbonates (and/or other enhancers, as further described in the present disclosure), or the like.

In another exemplary embodiment, a method of forming an air filtration assembly is described. The method includes providing an air filter. The air filter includes a plurality of filtration surfaces, including a first outer filtration surface, a second outer filtration surface opposite to the first outer filtration surface, and one or more inner filtration surfaces provided between the first and second outer filtration surfaces. The plurality of filtration surfaces are configured to trap one or more airborne particulates, including viruses and/or bacteria. The method further includes preparing a performance solution. The performance solution includes one or more metal ions. The method further includes preparing an enhancement solution. The enhancement solution includes one or more carbonates. The method further includes forming a disinfectant coating on the plurality of filtration surfaces. The disinfectant coating is for use in disinfecting trapped airborne particulates. The disinfectant coating is formed in such a way as to include a performance layer and an enhancement layer. The performance layer includes one or more metal ions, or the like. The enhancement includes one or more carbonates, or the like.

In another exemplary embodiment, a method of forming an air filtration assembly is described. The method includes providing an air filter. The air filter includes a plurality of filtration surfaces, including a first outer filtration surface, a second outer filtration surface opposite to the first outer filtration surface, and one or more inner filtration surfaces provided between the first and second outer filtration surfaces. The plurality of filtration surfaces is configured to trap one or more airborne particulates, including viruses and/or bacteria. The method further includes preparing a performance solution. The performance solution includes one or more metal ions, or the like. The method further includes preparing an enhancement solution. The enhancement solution includes one or more carbonates, or the like. The method further includes forming a disinfectant coating on the plurality of filtration surfaces. The disinfectant coating is for use in disinfecting trapped airborne particulates. The disinfectant coating is formed by precipitating the performance solution on the plurality of filtration surfaces to form a performance layer on the plurality of filtration surfaces; and precipitating the enhancement solution on the plurality of filtration surfaces to form an enhancement layer on the performance layer.

In another exemplary embodiment, a method of forming an air filtration assembly is described. The method includes providing an air filter. The air filter includes a plurality of filtration surfaces, including a first outer filtration surface, a second outer filtration surface opposite to the first outer filtration surface, and one or more inner filtration surfaces provided between the first and second outer filtration surfaces. The plurality of filtration surfaces is configured to trap one or more airborne particulates, including viruses and/or bacteria. The method further includes preparing a performance solution. The performance solution includes one or more metal ions, or the like. The method further includes preparing an enhancement solution. The enhancement solution includes one or more carbonates, or the like. The method further includes forming a disinfectant coating on the plurality of filtration surfaces. The disinfectant coating is for use in disinfecting trapped airborne particulates. The disinfectant coating is formed by precipitating the enhancement solution on the plurality of filtration surfaces to form an enhancement layer on the plurality of filtration surfaces; and precipitating the performance solution on the plurality of filtration surfaces to form a performance layer on the enhancement layer.

In another exemplary embodiment, a method of forming an air filtration assembly is described. The method includes providing an air filter. The air filter includes a plurality of filtration surfaces, including a first outer filtration surface, a second outer filtration surface opposite to the first outer filtration surface, and one or more inner filtration surfaces provided between the first and second outer filtration surfaces. The plurality of filtration surfaces is configured to trap one or more airborne particulates, including viruses and/or bacteria. The method further includes preparing a performance solution. The performance solution includes one or more metal ions, or the like. The method further includes preparing an enhancement solution. The enhancement solution includes one or more carbonates, or the like. The method further includes forming a disinfectant coating on the plurality of filtration surfaces. The disinfectant coating is for use in disinfecting trapped airborne particulates. The disinfectant coating is formed by simultaneously precipitating the enhancement solution and the performance solution on the plurality of filtration surfaces. The enhancement solution and the performance solution are simultaneously precipitated on the plurality of filtration surfaces by separately applying (e.g., spraying) the enhancement solution and the performance solution onto the plurality of filtration surfaces.

BRIEF DESCRIPTION OF THE FIGURES

For a more complete understanding of the present disclosure, example embodiments, and their advantages, reference is now made to the following description taken in conjunction with the accompanying figures, in which like reference numbers indicate like features, and.

Although similar reference numbers may be used to refer to similar elements in the figures for convenience, it can be appreciated that each of the various example embodiments may be considered to be distinct variations.

Figure 1:
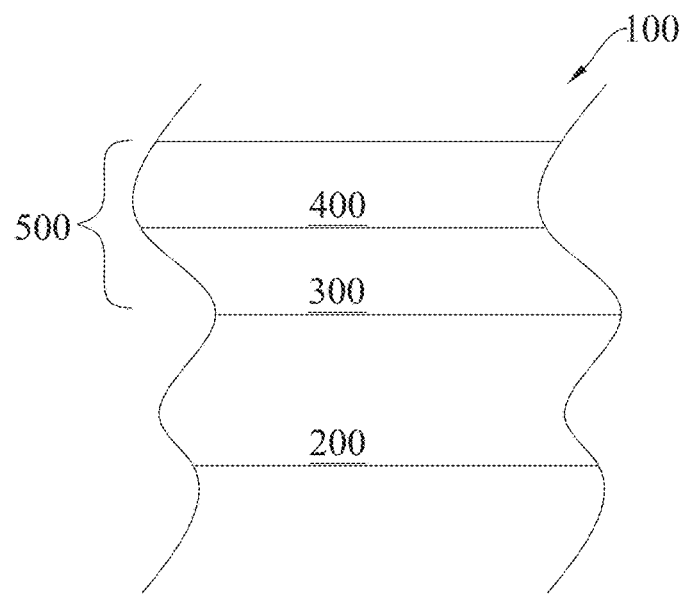
FIG. 1 illustrates a cross-sectional view of an example embodiment of an air filtration system.

Example embodiments will now be described with reference to the accompanying figures, which form a part of the present disclosure and which illustrate example embodiments which may be practiced. As used in the present disclosure and the appended claims, the terms "embodiment," "example embodiment," "exemplary embodiment," "present embodiment," and "preferred embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and appended claims, the words "and/or" may refer to and encompass any or all possible combinations of one or more of the associated listed items.

DETAILED DESCRIPTION

Harmful airborne particulates, such as bacteria and viruses (e.g., the COVID-19 virus), have become increasingly widespread and dangerous over the years. Fortunately, conventional air filtration systems have been relatively useful in filtering out small airborne particulates by trapping such particulates with air filters.

While conventional air filters are effective in removing small airborne particulates from the air, it is recognized in the present disclosure that certain airborne bacteria and viruses can remain harmful (e.g., remain infectious) for extended periods of time. In this regard, such harmful airborne bacteria and viruses that are trapped, captured, and/or attached to the air filters may, for a variety of reasons, become untrapped, uncaptured, and/or detached from the air filters and re-enter the air.

Present example embodiments relate generally to systems, subsystems, methods, and processes for addressing conventional problems, including those described above and in the present disclosure, and more specifically, example embodiments relate to systems, subsystems, methods, and processes for the treatment, disinfection, purification, sanitization, or the like (referred to herein as "treating", "treatment", or the like) of air, other gases, vapors, condensates, precipitates, or the like (also referred to herein as a "medium" or "air", or the like), including the destruction, denaturation, decomposing, and/or rendering harmless of airborne particulates, impurities, or the like (including harmful viruses and/or bacteria).

It is to be understood that, while example embodiments are mostly described in the present disclosure as pertaining to air filtration systems, air filters, and forming of disinfectant coatings/layers on air filters, the principles described in the present disclosure may also be applied beyond the context of air filtration systems, air filters, and forming of disinfectant coatings/layers on air filters and/or air filtration systems, such as use with, on, and/or associated with other mediums and objects (e.g., walls, windows, ceilings, fans, ventilation ducts, etc.) and forming of disinfectant coatings/layers on such other mediums and objects (e.g., walls, windows, ceilings, fans, ventilation ducts, etc.), without departing from the teachings of the present disclosure.

Example embodiments will now be described below with reference to the accompanying figures, which form a part of the present disclosure.

Example Embodiments of an Air Filtration System (e.g., System 100).

As illustrated in FIG. 1, an example embodiment of an air filtration system (e.g., system 100; also referred to herein as "air filtration assembly") for treating a medium (e.g., air or other gases), including those with particulates in the medium (e.g., viruses and/or bacteria), includes an air filter (e.g., air filter 200). The system 100 also includes a disinfectant coating (e.g., disinfectant coating 500). As will be further described in the present disclosure, the disinfectant coating 500 includes a performance layer (e.g., performance layer 300) and an enhancement layer (e.g., enhancement layer 400).

Example embodiments of the air filtration system 100 and elements thereof will now be further described with reference to the accompanying figures, which form a part of the present disclosure.

Air Filter (e.g., Air Filter 200).

Figure 2A:
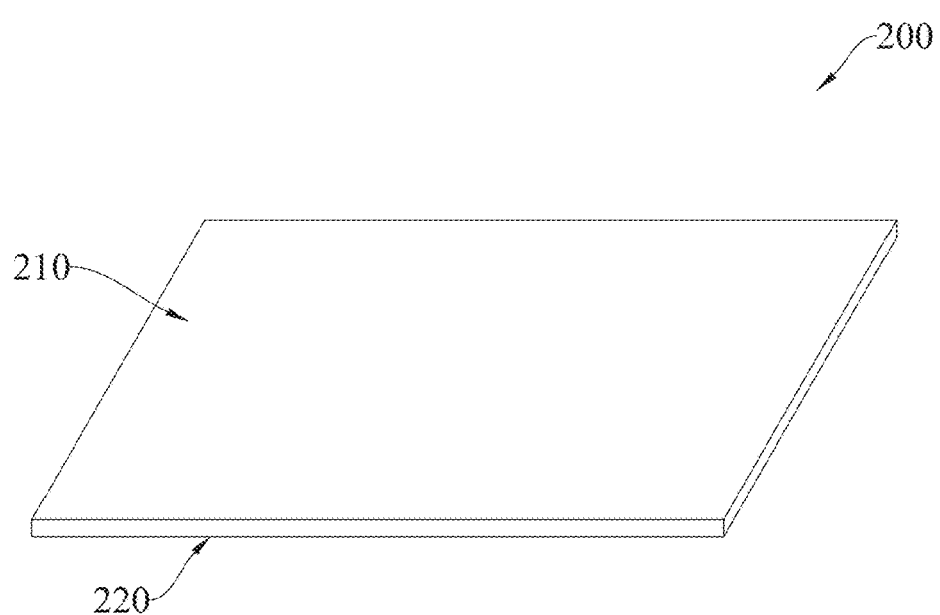
FIG. 2A illustrates a perspective view of an example embodiment of an air filter for the air filtration system.

FIG. 2A illustrates a perspective view of an example embodiment of an air filter (e.g., air filter 200) for the air filtration system 100. The air filter 200 may be any air filter, including those formed with and/or having porous materials suitable for filtration applications, configurable or configured to filter, trap, or the like, particulates, impurities, or the like, in a medium (e.g., air). For example, the air filter 200 may be configurable or configured to filter, trap, or the like, viruses, bacteria, or the like, in air and/or other mediums.

Figure 2B:
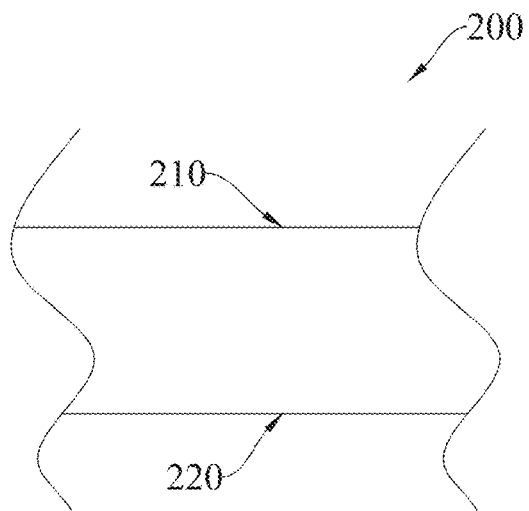
FIG. 2B illustrates a cross-sectional view of an example embodiment an air filter for the air filtration system.

Example embodiments of the air filter 200 may be formed in one or more of a plurality of shapes, sizes, forms, and configurations. For example, as illustrated in at least FIG. 2A and the cross-sectional view of FIG. 2B, the air filter 200 may be formed as or in the form of a flat or planar sheet, or the like. The air filter 200 may also be formed in other shapes, forms, and/or configurations, such as a tubular or cylindrical shape, hollow cubical shape, conical shape, etc. In example embodiments, the air filter may include pores, holes, openings, or the like (not shown), formed through its surfaces (e.g., 210, 220, 230) and/or within interior portions between one or more of its surfaces (e.g., 210, 220, 230). As illustrated in at least FIGS. 2A and 2B, the air filter 200 may include one or more first outer filtration surfaces 210. The air filter 200 may also include one or more second outer filtration surfaces 220. Although example embodiments of the second outer filtration surface 220 are illustrated to be opposite to the first outer filtration surface 210, it is to be understood that the second outer filtration surface 220 may not necessarily be opposite to the first outer filtration surface 210.

Figure 2C:
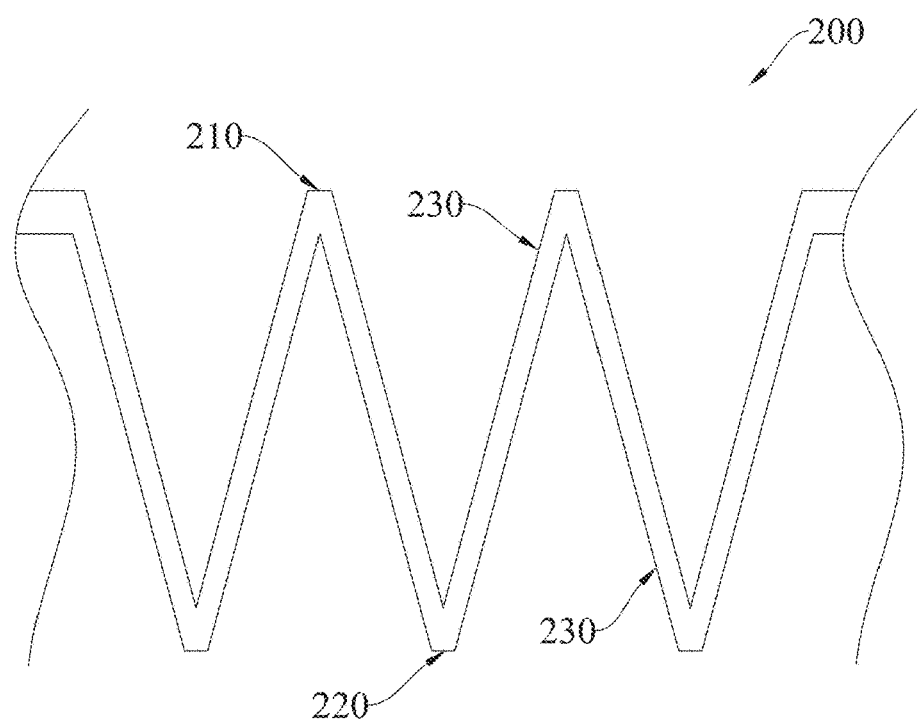
FIG. 2C illustrates a cross-sectional view of another example embodiment of an air filter for the air filtration system.

FIG. 2C illustrates a cross-sectional view of another example embodiment of the air filter 200. In this example embodiment, the air filter 200 may be formed having folds (e.g., as shown in FIG. 2C), protrusions, indentations/holes, and/or the like, for increasing effective surface area for the filtration of incoming or passing medium (e.g., air). In this regard, the air filter 200 includes one or more first outer filtration surfaces 210, one or more second outer filtration surfaces 220, and one or more inner filtration surfaces 230. It is to be understood that one or more of the inner filtration surfaces 230 may also be considered as a first outer filtration surface 210 and/or second outer filtration surface 220 without departing from the teachings of the present disclosure.

Figure 2D:
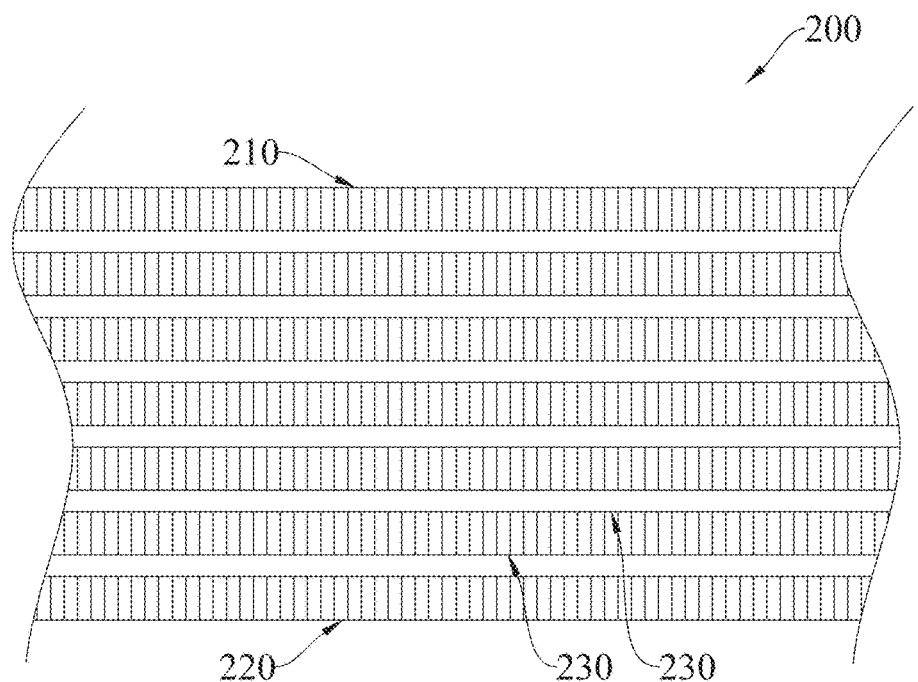
FIG. 2D illustrates a cross-sectional view of another example embodiment of an air filter for the air filtration system.

FIG. 2D illustrates a cross-sectional view of another example embodiment of the air filter 200. In this example embodiment, the air filter 200 may be formed having a plurality of layers, sections, or the like. For example, the air filter 200 illustrated in FIG. 2D may be formed having a plurality of air filters 200 (e.g., the air filter illustrated in FIG. 2B). In an example embodiment, the plurality of air filters 200 may be separated by a gap (e.g., as illustrated in FIG. 2D). Alternatively, the plurality of air filters 200 may be stacked together with little or no gap between layers (not shown). The air filter 200 includes one or more first outer filtration surfaces 210, one or more second outer filtration surfaces 220, and a plurality of inner filtration surfaces 230. It is to be understood that the inner filtration surfaces 230 may also be considered as a first outer filtration surface 210 and/or second outer filtration surface 220 without departing from the teachings of the present disclosure.

Figure 2E:
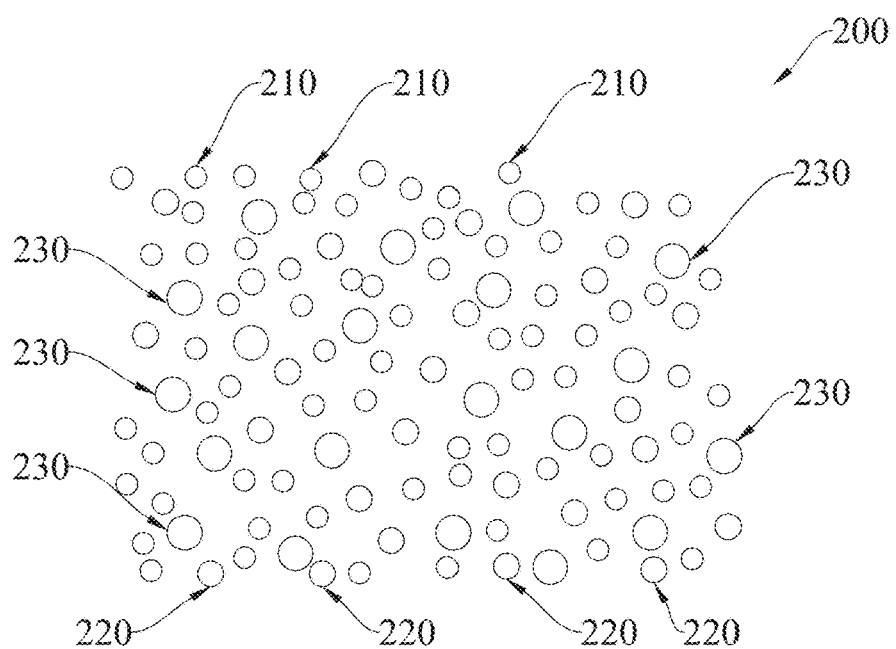
FIG. 2E illustrates a zoomed in cross-sectional view of another example embodiment of an air filter for the air filtration system.

FIG. 2E illustrates a cross-sectional view of another example embodiment of the air filter 200. In this example embodiment, the air filter 200 may be formed having a plurality of fibers (cross-sections of the fibers illustrated as circular shapes in FIG. 2E), or the like. In an example embodiment, some or all of the parts of the plurality of fibers may be separated by gaps. The air filter 200 includes one or more first outer filtration surfaces 210 (which may be one or more parts of the fibers that are provided at an outer surface of the air filter 200), one or more second outer filtration surfaces 220 (which may be one or more parts of the fibers that are provided at another outer surface of the air filter), and a plurality of inner filtration surfaces 230 (which may be one or more parts of the fibers that are provided between the outer surfaces of the air filter 200).

Disinfectant Coating (e.g., Disinfectant Coating 500).

The system 100 for treating a medium (e.g., air or other gases) may also include a disinfectant coating (e.g., disinfectant coating 500). The disinfectant coating 500 may be formed by applying an example embodiment of a performance solution so as to form a performance layer (e.g., performance layer 300). The disinfectant coating 500 may also be formed by applying an example embodiment of an enhancement solution so as to form an enhancement layer 400. In this regard, the disinfectant coating 500 may include one or more performance layers 300 and one or more enhancement layers 400.

Example embodiments of the performance layer 300 and the enhancement layer 400 will now be further described with reference to the accompanying figures, which form a part of the present disclosure.

Performance Layer (e.g., Performance Layer 300).

In an example embodiment, the disinfectant coating 500 may include one or more performance layers (e.g., performance layer 300). The performance layer 300 may be formed on one or more portions of the air filter 200 and/or the enhancement layer 400. As will be further described in the present disclosure, the performance layer 300 includes metal ions, or the like (referred to herein as "metal ions"). It is recognized in the present disclosure that the performance layer 300 (and metal ions therein) are effective in, among other things, contacting and reacting with bacteria cells, and in doing so cause the destruction or dysfunction of bacterial components. When metal ions of the performance layer 300 reach the cell wall, the cell wall becomes negatively charged and, relying on Coulomb attraction, the metal ions become firmly adsorbed or attached to the cell wall. The metal ions of the performance layer 300 are then operable to penetrate the cell wall and destroy cell synthesis activity. Accordingly, cells lose their ability to divide and proliferate, and die. Furthermore, the metal ions in the performance layer 300 are operable to damage the microbial electronic transmission system, respiratory system and material transmission system. In terms of viruses, the metal ions in the performance layer 300 are operable to mechanically adsorb and attach to the virus, react with the virus surface protein, inactivate the enzyme protein, and bind with the viral nucleic acid.

Figure 3A:
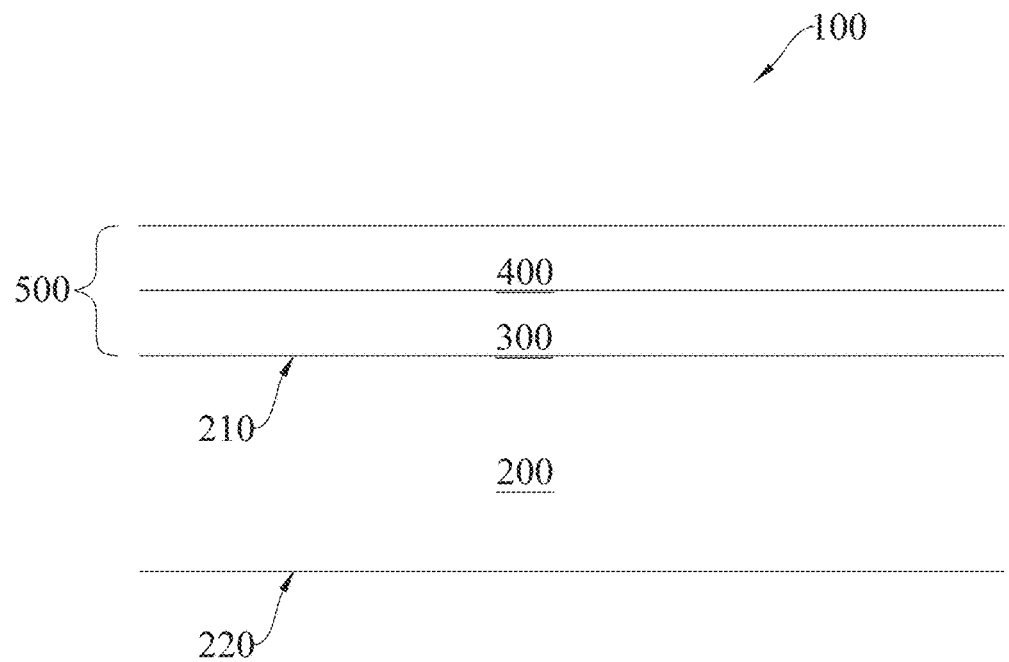
FIG. 3A illustrates a cross-sectional view of an example embodiment of an air filtration system having a performance layer formed on a surface of an air filter and an enhancement layer formed on the performance layer.
Figure 3B:
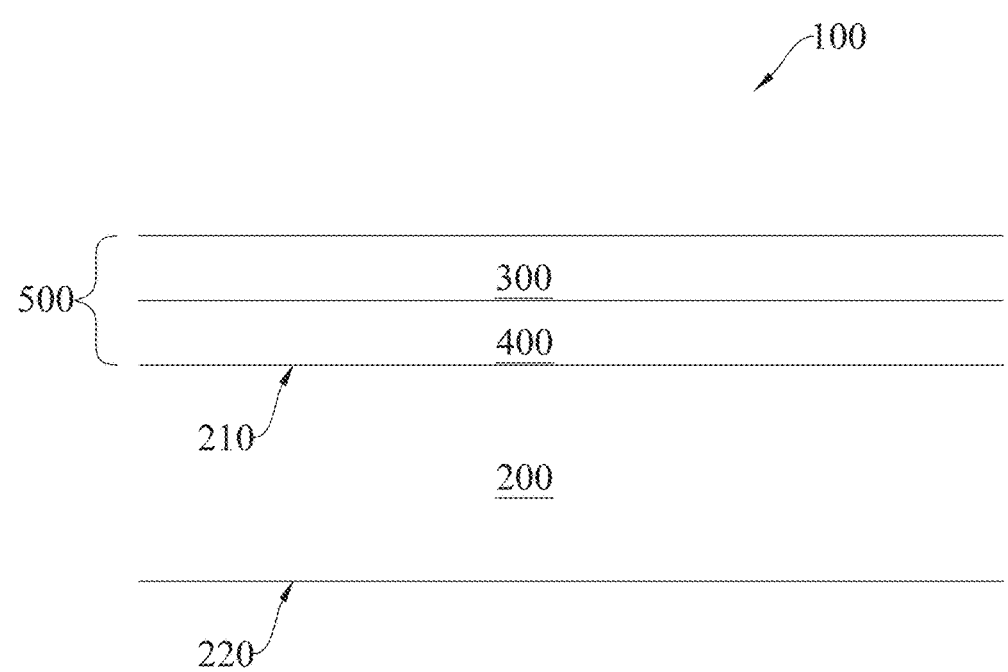
FIG. 3B illustrates a cross-sectional view of an example embodiment of an air filtration system having an enhancement layer formed on a surface of an air filter and a performance layer formed on the enhancement layer.
Figures 3C, 3D:
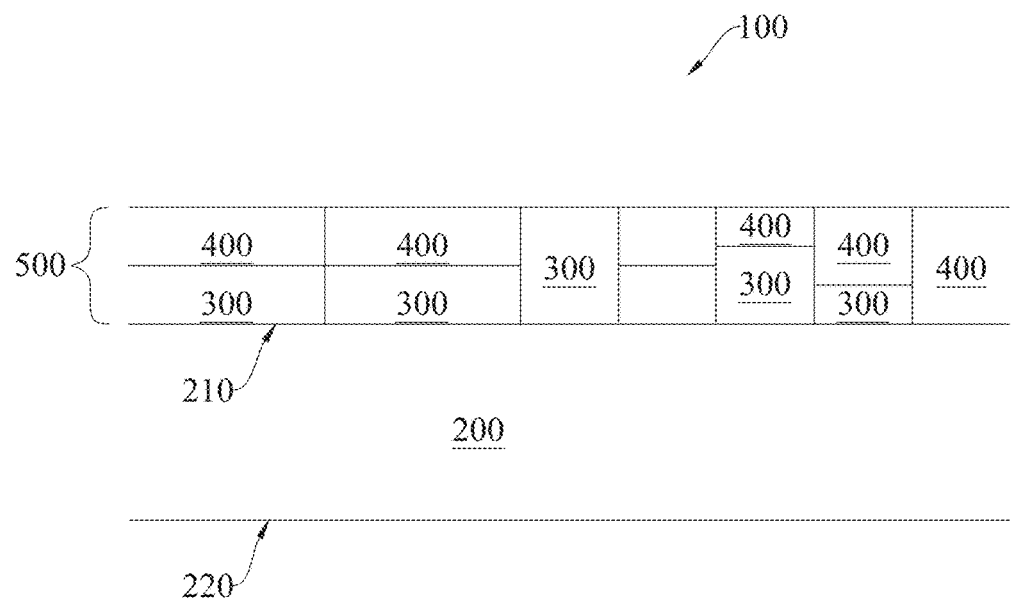
FIG. 3C illustrates a cross-sectional view of an example embodiment of an air filtration system having a mixed layer of metal ions and enhancers.
FIG. 3D illustrates a cross-sectional view of an example embodiment of an air filtration system having enhancement layers and performance layers formed on a surface of an air filter.
Figure 3E:
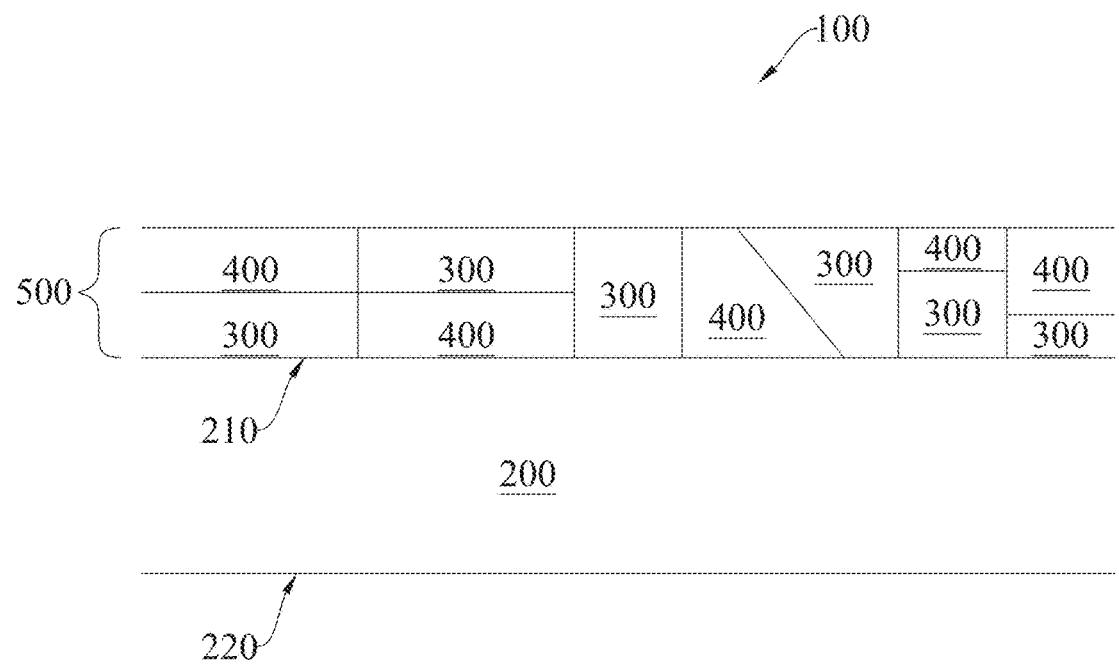
FIG. 3E illustrates a cross-sectional view of another example embodiment of an air filtration system having enhancement layers and performance layers formed on a surface of an air filter.
Figure 3F:
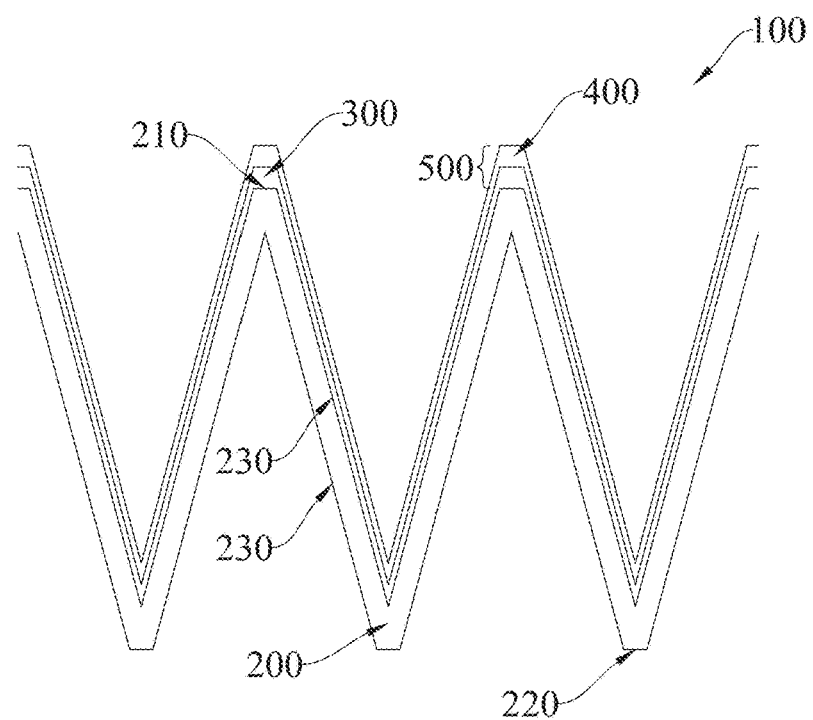
FIG. 3F illustrates a cross-sectional view of another example embodiment of an air filtration system having enhancement layers and performance layers formed on a plurality of surfaces of an air filter.
Figure 3G:
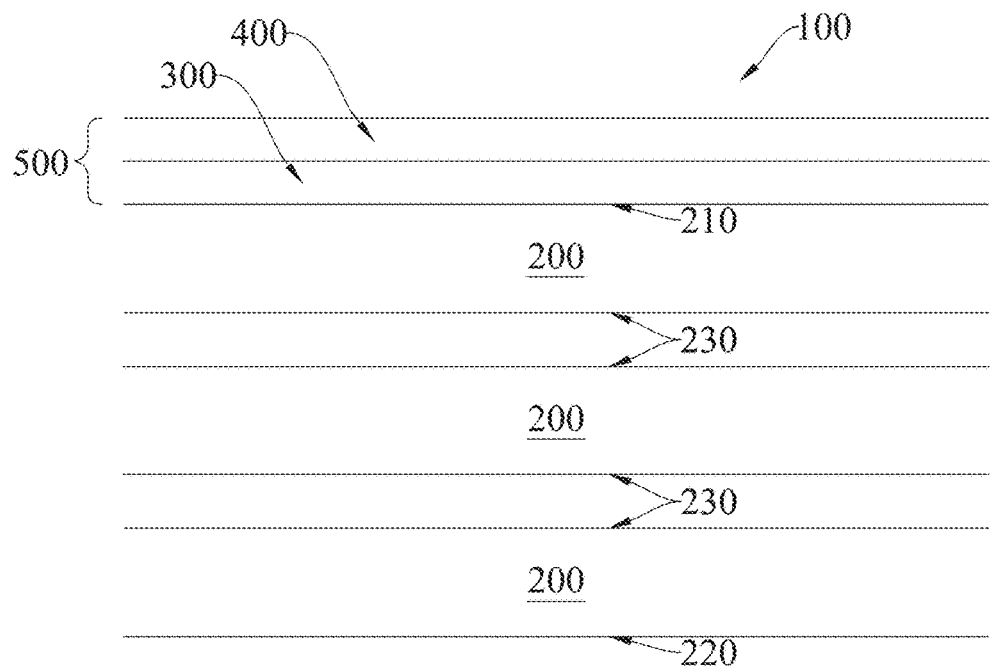
FIG. 3G illustrates a cross-sectional view of another example embodiment of an air filtration system having enhancement layers and performance layers formed on a surface of an air filter.
Figure 3H:
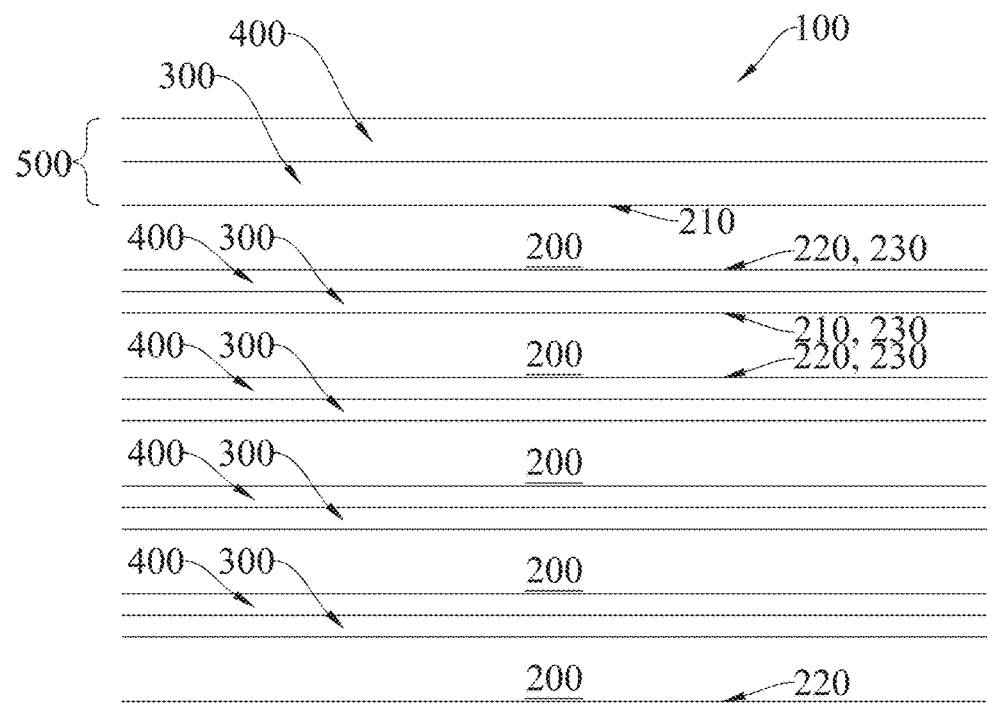
FIG. 3H illustrates a cross-sectional view of another example embodiment of an air filtration system having enhancement layers and performance layers formed on a plurality of surfaces of an air filter.
Figure 3I:
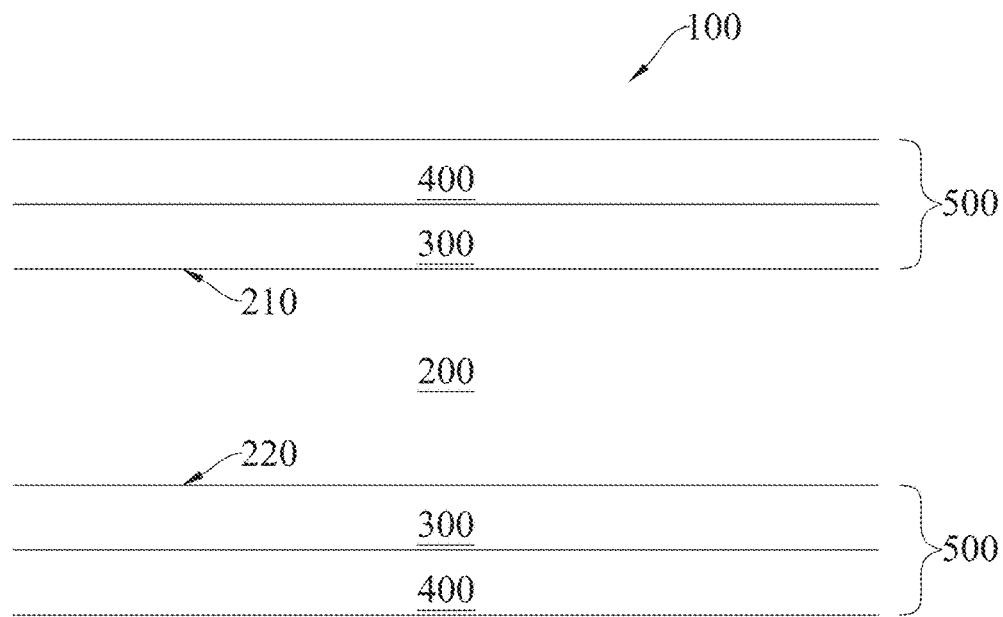
FIG. 3I illustrates a cross-sectional view of another example embodiment of an air filtration system having enhancement layers and performance layers formed on a plurality of surfaces of an air filter.
Figure 3J:
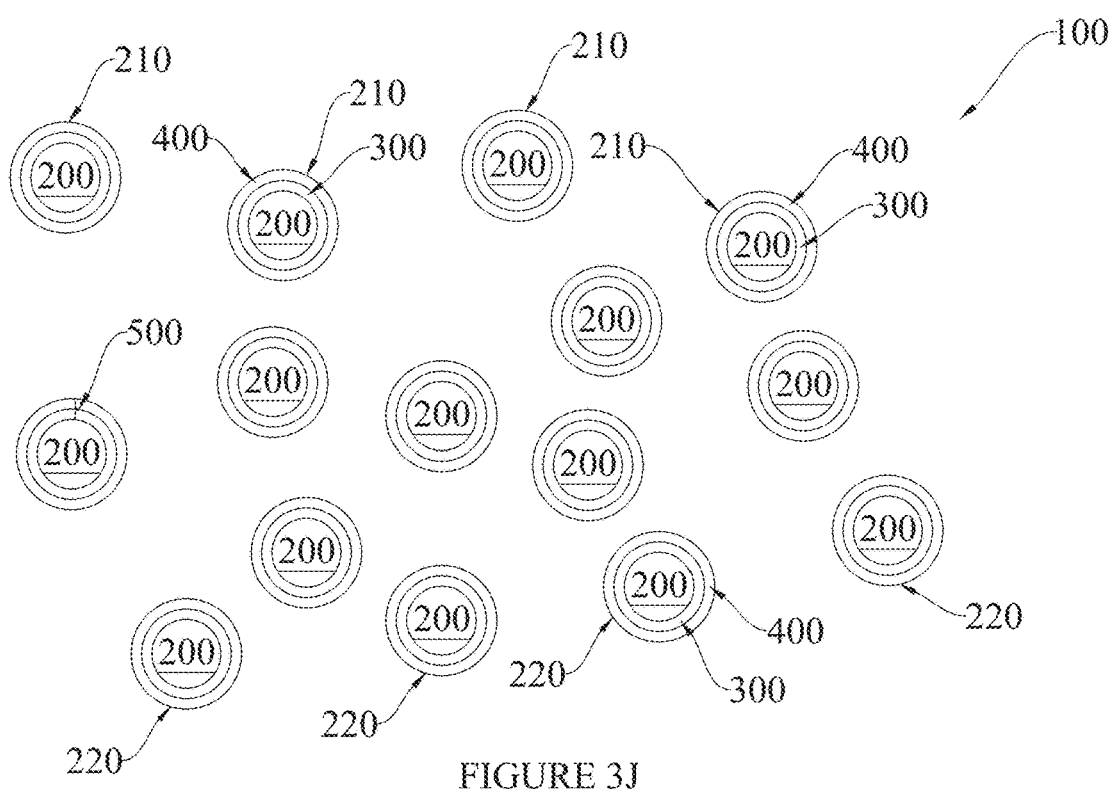
FIG. 3J illustrates a zoomed in cross-sectional view of an example embodiment of an air filtration system having enhancement and performance layers formed on the fibers of the air filters.

For example, as illustrated in at least FIG. 3A and FIG. 3J, an example embodiment of the performance layer 300 may be formed on one or more portions of the first outer filtration surface 210 of the air filter 200. The performance layer 300 formed on the first outer filtration surface 210 may be formed in such a way as to include between about 0.00001 to 0.5 $g/m^2$ of metal ions. In preferred embodiments, the performance layer 300 formed on the first outer filtration surface 210 includes between about 0.001 to 0.01 $g/m^2$ of metal ions. Metal ions present in the performance layer 300 formed on the first outer filtration surface 210 may include, but are not limited to, one or more of the following: silver (Ag) ions, copper (Cu) ions, zinc (Zn) ions, cobalt (Co) ions, tin (Sn) ions, iodine (I) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions. In example embodiments, a wet weight of the performance layer 300 (e.g., wet weight may be a weight or weight percentage of the liquid (or wet) performance solution applied (but not yet dried) to form the performance layer 300) formed on the first outer filtration surface 210 is between about 0.1 to 200% of a weight of the air filter 200. In preferred embodiments, a wet weight of the performance layer 300 formed on the first outer filtration surface 210 is between about 30 to 50% of a weight of the air filter 200.

Alternatively or in addition, the performance layer 300 may be formed on one or more portions of the second outer filtration surface 220 of the air filter 200, as illustrated in at least FIG. 3I. The performance layer 300 formed on the second outer filtration surface 220 may be formed in such a way as to include between about 0.00001 to 0.5 $g/m^2$ of metal ions. In preferred embodiments, the performance layer 300 formed on the second outer filtration surface 220 includes between about 0.001 to 0.01 $g/m^2$ of metal ions. Metal ions present in the performance layer 300 formed on the second outer filtration surface 220 may include, but are not limited to, one or more of the following: silver (Ag) ions, copper (Cu) ions, zinc (Zn) ions, cobalt (Co) ions, tin (Sn) ions, iodine (I) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions. In example embodiments, a wet weight of the performance layer 300 (e.g., weight or weight percentage of the liquid (or wet) performance solution applied (but not yet dried) to form the performance layer 300) formed on the second outer filtration surface 220 is between about 0.1 to 200% of a weight of the air filter 200. In preferred embodiments, a wet weight of the performance layer 300 formed on the second outer filtration surface 220 is between about 30 to 50% of a weight of the air filter 200. Alternatively, in example embodiments where the performance layer 300 is also formed on the first outer filtration surface 210 and/or inner filtration surface 230, a collective wet weight of the performance layer 300 (e.g., wet weight may be a weight or weight percentage of the liquid (or wet) performance solution applied (but not yet dried) to form the performance layer 300) may be between about 0.1 to 200% of a weight of the air filter 200. In preferred embodiments where the performance layer 300 is also formed on the first outer filtration surface 210 and/or inner filtration surface 230, a collective wet weight of the performance layer 300 may be between about 30 to 50% of a weight of the air filter 200. It is to be understood that the metal ions present in the performance layer 300 formed on the second outer filtration surface 220 may or may not be the same as the metal ions present in the performance layer 300 formed on the first outer filtration surface 210 and/or the inner filtration surface 230. It is also to be understood that the concentration ($g/m^2$) of metal ions in the presentation layer 300 formed on the second outer filtration surface 220 may or may not be the same as the concentration ($g/m^2$) of metal ions in the presentation layer 300 formed on the first outer filtration surface 210 and/or the inner filtration surface 230. It is also to be understood that the weight percentage (as compared to the weight of the air filter 200) of metal ions in the presentation layer 300 formed on the second outer filtration surface 220 may or may not be the same as the weight percentage (as compared to the weight of the air filter 200) of metal ions in the presentation layer 300 formed on the first outer filtration surface 210 and/or the inner filtration surface 230.

As illustrated in at least FIG. 3F and FIG. 3H, an example embodiment of the performance layer 300 may be formed on one or more portions of the inner filtration surface 230. The performance layer 300 formed on the inner filtration surface 230 may be formed in such a way as to include between about 0.00001 to 0.5 $g/m^2$ of metal ions. In preferred embodiments, the performance layer 300 formed on the inner filtration surface 230 includes between about 0.001 to 0.01 $g/m^2$ of metal ions. Metal ions present in the performance layer 300 formed on the inner filtration surface 230 may include, but are not limited to, one or more of the following: silver (Ag) ions, copper (Cu) ions, zinc (Zn) ions, cobalt (Co) ions, tin (Sn) ions, iodine (I) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions. In example embodiments, a wet weight of the performance layer 300 (e.g., weight or weight percentage of the liquid (or wet) performance solution applied (but not yet dried) to form the performance layer 300) formed on the inner filtration surface 230 is between about 0.1 to 200% of a weight of the air filter 200. In preferred embodiments, a wet weight of the performance layer 300 formed on the inner filtration surface 230 is between about 30 to 50% of a weight of the air filter 200. Alternatively, in example embodiments where the performance layer 300 is also formed on the first outer filtration surface 210 and/or second outer filtration surface 220, a collective wet weight of the performance layer 300 (e.g., weight or weight percentage of the liquid (or wet) performance solution applied (but not yet dried) to form the performance layer 300) may be between about 0.1 to 200% of a weight of the air filter 200. In preferred embodiments where the performance layer 300 is also formed on the first outer filtration surface 210 and/or second outer filtration surface 220, a collective wet weight of the performance layer 300 may be between about 30 to 50% of a weight of the air filter 200. It is to be understood that the metal ions present in the performance layer 300 formed on the inner filtration surface 230 may or may not be the same as the metal ions present in the performance layer 300 formed on the first outer filtration surface 210 and/or the second outer filtration surface 220. It is also to be understood that the concentration ($g/m^2$) of metal ions in the presentation layer 300 formed on the inner filtration surface 230 may or may not be the same as the concentration ($g/m^2$) of metal ions in the presentation layer 300 formed on the first outer filtration surface 210 and/or the second outer filtration surface 220. It is also to be understood that the weight percentage (as compared to the weight of the air filter 200) of metal ions in the presentation layer 300 formed on the inner filtration surface 230 may or may not be the same as the weight percentage (as compared to the weight of the air filter 200) of metal ions in the presentation layer 300 formed on the first outer filtration surface 210 and/or the second outer filtration surface 220.

Figure 3K:
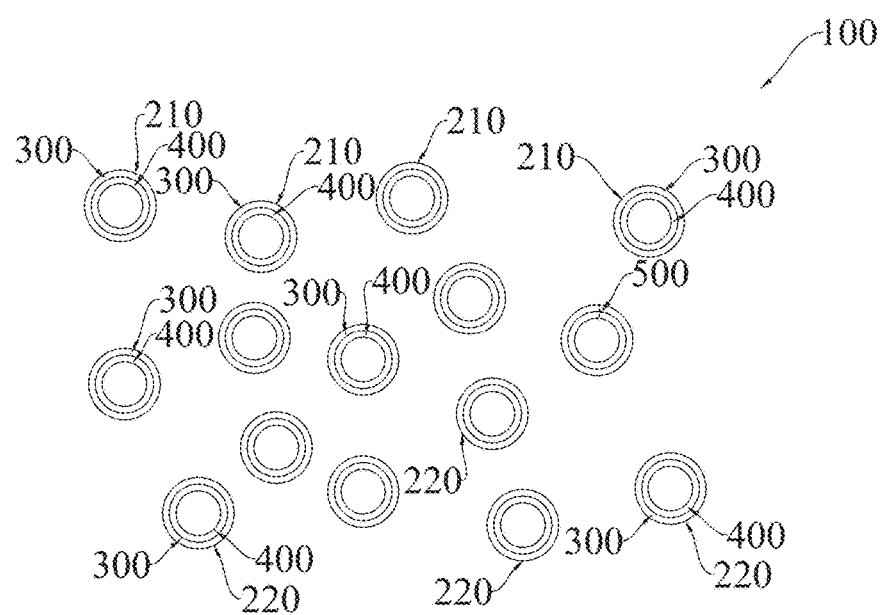
FIG. 3K illustrates a zoomed in cross-sectional view of another example embodiment of an air filtration system having enhancement and performance layers formed on the fibers of the air filters.
Figure 3L:
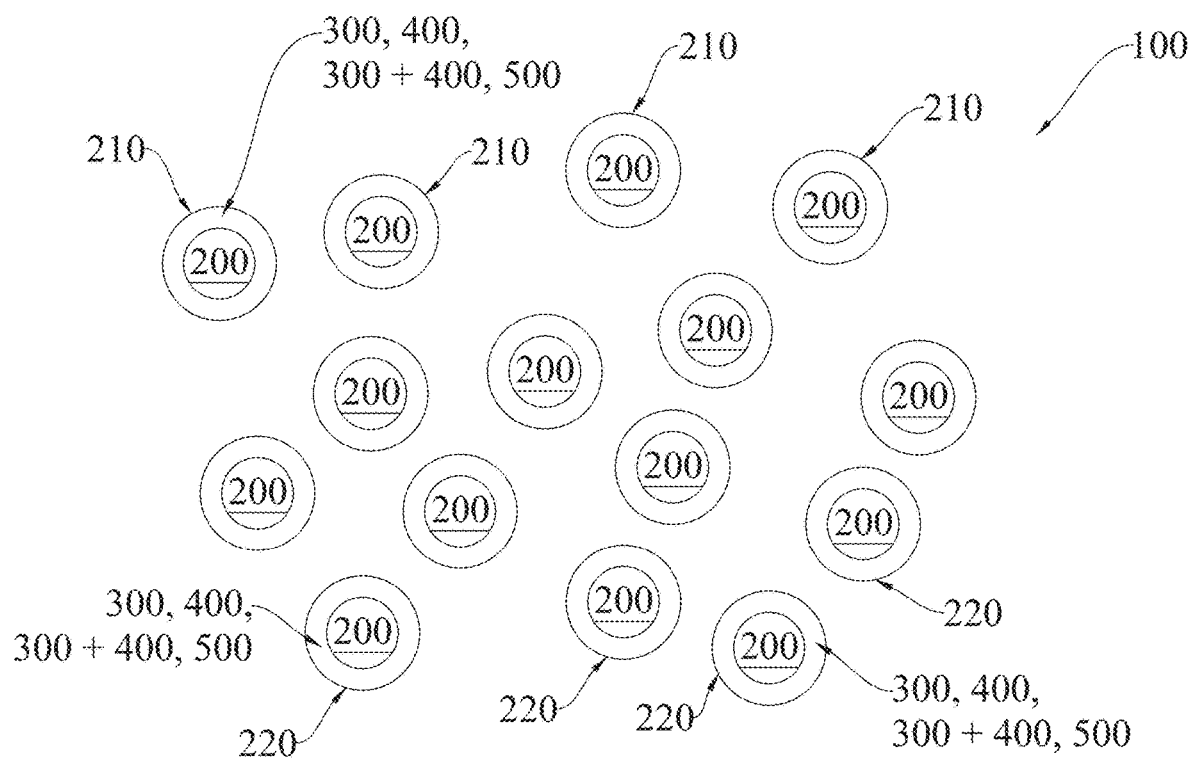
FIG. 3L illustrates a zoomed in cross-sectional view of an example embodiment of an air filtration system having a mixed layer of metal ions and enhancers formed on the fibers of the air filters.

In another example embodiment illustrated in at least FIG. 3B and FIG. 3K, the performance layer 300 may be formed on at least a portion of the enhancement layer 400 (which may be formed on the first outer filtration surface 210 and/or the second outer filtration surface 220 and/or the inner filtration surface 230). The performance layer 300 formed on the enhancement layer 400 may be formed in such a way as to include between about 0.00001 to 0.5 $g/m^2$ of metal ions. In preferred embodiments, the performance layer 300 formed on the enhancement layer 400 includes between about 0.001 to 0.01 $g/m^2$ of metal ions. Metal ions present in the performance layer 300 formed on the enhancement layer 400 may include, but are not limited to, one or more of the following: silver (Ag) ions, copper (Cu) ions, zinc (Zn) ions, cobalt (Co) ions, tin (Sn) ions, iodine (I) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions. In example embodiments, a wet weight of the performance layer 300 (e.g., weight or weight percentage of the liquid (or wet) performance solution applied (but not yet dried) to form the performance layer 300) formed on the enhancement layer 400 is between about 0.1 to 200% of a weight of the air filter 200. In preferred embodiments, a wet weight of the performance layer 300 formed on the enhancement layer 400 is between about 30 to 50% of a weight of the air filter 200.

The performance layer 300 may be formed using a performance solution, or the like. In an example embodiment, the performance solution may include a composition of 0.0001 to 5% of one or more of the following: $AgNO_3$, $Ag_2O$, $Ag_2SO_4$, $Ag_2S$, $AgCl$, $Ag_2CO_3$, $CuO$, $CuCO_3$, $CuSO_4$, $Cu(NO_3)_2$, $CuCl_2$, $ZnO$, $ZnCl_2$, $ZnS$, $ZnSO_4$, $Zn(NO_3)_2$, $ZnCO_3$, and/or other soluble components that contain Co, Sn, I, Cr, Te, Ge, Bi, Sn, Pb, Cd, Ti, and/or Hg ions. In preferred embodiments, the performance solution may include a composition of 0.005 to 0.1% of one or more of the following: $AgNO_3$, $Ag_2O$, $Ag_2SO_4$, $Ag_2S$, $AgCl$, $Ag_2CO_3$, $CuO$, $CuCO_3$, $CuSO_4$, $Cu(NO_3)_2$, $CuCl_2$, $ZnO$, $ZnCl_2$, $ZnS$, $ZnSO_4$, $Zn(NO_3)_2$, $ZnCO_3$, and/or other soluble components that contain Co, Sn, I, Cr, Te, Ge, Bi, Sn, Pb, Cd, Ti, and/or Hg ions. The performance layer 300 may be formed in one or more ways including, but not limited to, spraying the performance solution onto one or more surfaces of the air filter 200 and/or the enhancement layer 400; dipping the air filter 200 into the performance solution; brushing the performance solution onto the one or more surfaces of the air filter 200 and/or the enhancement layer 400; dipping the air filter 200 into the performance solution and spraying the performance solution; brushing the performance solution onto the one or more surfaces of the air filter 200 and/or the enhancement layer 400 and spraying the performance solution; and/or dipping the air filter 200 into the performance solution and brushing the performance solution onto the one or more surfaces of the air filter 200 and/or the enhancement layer 400.

Enhancement Layer (e.g., Enhancement Layer 400).

In an example embodiment, the disinfectant coating 500 may include one or more enhancement layers (e.g., enhancement layer 400). The enhancement layer 400 may be formed on one or more portions of the air filter 200 and/or the performance layer 300. As will be further described in the present disclosure, the enhancement layer 400 includes carbonates, enhancers, alkaline, or the like (referred to herein as "enhancer"). It is recognized in the present disclosure that the enhancement layer 400 (including carbonates therein) is effective in, among other things, decomposing lipid molecules of bacteria and/or viruses, thereby helping, accelerating, enhancing, or the like, the performance layer 300 (including metal ions therein) in penetrating, destroying, rupturing, or the like, the cell walls of the bacteria and/or viruses, thereby destroying cell synthesis activity in such a way that the cells of the bacteria and/or viruses lose their ability to divide and proliferate (and die, achieving the effect of sterilization).

As illustrated in at least FIG. 3B and FIG. 3K, an example embodiment of the enhancement layer 400 may be formed on one or more portions of the first outer filtration surface 210 of the air filter 200. The enhancement layer 400 formed on the first outer filtration surface 210 may be formed in such a way as to include between about 0.0001-50 $g/m^2$ of carbonates (or other enhancers). In preferred embodiments, the enhancement layer 400 formed on the first outer filtration surface 210 includes between about 0.001-10 $g/m^2$ of enhancers Enhancers present in the enhancement layer 400 formed on the first outer filtration surface 210 may include, but are not limited to, one or more of the following: $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue. In example embodiments, a wet weight of the enhancement layer 400 (e.g., weight or weight percentage of the liquid (or wet) enhancement solution applied (but not yet dried) to form the enhancement layer 400) formed on the first outer filtration surface 210 is between about 0.1 to 200% of a weight of the air filter 200. In preferred embodiments, a wet weight of the enhancement layer 400 formed on the first outer filtration surface 210 is between about 30 to 50% of a weight of the air filter 200.

Alternatively or in addition, the enhancement layer 400 may be formed on one or more portions of the second outer filtration surface 220 of the air filter 200. The enhancement layer 400 formed on the second outer filtration surface 220 may be formed in such a way as to include between about 0.0001-50 $g/m^2$ of enhancers. In preferred embodiments, the enhancement layer 400 formed on the second outer filtration surface 220 includes between about 0.001-10 $g/m^2$ of enhancers Enhancers present in the enhancement layer 400 formed on the second outer filtration surface 220 may include, but are not limited to, one or more of the following: $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue. In example embodiments, a wet weight of the enhancement layer 400 (e.g., weight or weight percentage of the liquid (or wet) enhancement solution applied (but not yet dried) to form the enhancement layer 400) formed on the second outer filtration surface 220 is between about 0.1 to 200% of a weight of the air filter 200. In preferred embodiments, a wet weight of the enhancement layer 400 formed on the second outer filtration surface 220 is between about 30 to 50% of a weight of the air filter 200. Alternatively, in example embodiments where the enhancement layer 400 is also formed on the first outer filtration surface 210 and/or inner filtration surface 230, a collective wet weight of the enhancement layer 400 (e.g., weight or weight percentage of the liquid (or wet) enhancement solution applied (but not yet dried) to form the enhancement layer 400) may be between about 0.1 to 200% of a weight of the air filter 200. In preferred embodiments where the enhancement layer 400 is also formed on the first outer filtration surface 210 and/or inner filtration surface 230, a collective wet weight of the enhancement layer 400 may be between about 30 to 50% of a weight of the air filter 200. It is to be understood that the enhancers present in the enhancement layer 400 formed on the second outer filtration surface 220 may or may not be the same as the enhancers present in the enhancement layer 400 formed on the first outer filtration surface 210 and/or the inner filtration surface 230. It is also to be understood that the concentration ($g/m^2$) of enhancers in the enhancement layer 400 formed on the second outer filtration surface 220 may or may not be the same as the concentration ($g/m^2$) of enhancers in the enhancement layer 400 formed on the first outer filtration surface 210 and/or the inner filtration surface 230. It is also to be understood that the weight percentage (as compared to the weight of the air filter 200) of enhancers in the enhancement layer 400 formed on the second outer filtration surface 220 may or may not be the same as the weight percentage (as compared to the weight of the air filter 200) of enhancers in the enhancement layer 400 formed on the first outer filtration surface 210 and/or the inner filtration surface 230.

As illustrated in at least FIGS. 3F and 3H, an example embodiment of the enhancement layer 400 may be formed on one or more portions of the inner filtration surface 230. The enhancement layer 400 formed on the inner filtration surface 230 may be formed in such a way as to include between about 0.0001-50 $g/m^2$ of enhancers. In preferred embodiments, the enhancement layer 400 formed on the inner filtration surface 230 includes between about 0.001-10 $g/m^2$ of enhancers. Enhancers present in the enhancement layer 400 formed on the inner filtration surface 230 may include, but are not limited to, one or more of the following: $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue. In example embodiments, a wet weight of the enhancement layer 400 (e.g., weight or weight percentage of the liquid (or wet) enhancement solution applied (but not yet dried) to form the enhancement layer 400) formed on the inner filtration surface 230 is between about 0.1 to 200% of a weight of the air filter 200. In preferred embodiments, a wet weight of the enhancement layer 400 formed on the inner filtration surface 230 is between about 30 to 50% of a weight of the air filter 200. Alternatively, in example embodiments where the enhancement layer 400 is also formed on the first outer filtration surface 210 and/or second outer filtration surface 220, a collective wet weight of the enhancement layer 400 (e.g., weight or weight percentage of the liquid (or wet) enhancement solution applied (but not yet dried) to form the enhancement layer 400) may be between about 0.1 to 200% of a weight of the air filter 200. In preferred embodiments where the enhancement layer 400 is also formed on the first outer filtration surface 210 and/or second outer filtration surface 220, a collective wet weight of the enhancement layer 400 may be between about 30 to 50% of a weight of the air filter 200. It is to be understood that the enhancers present in the enhancement layer 400 formed on the inner filtration surface 230 may or may not be the same as the enhancers present in the enhancement layer 400 formed on the first outer filtration surface 210 and/or the second outer filtration surface 220. It is also to be understood that the concentration (g/m$^2$) of enhancers in the enhancement layer 400 formed on the inner filtration surface 230 may or may not be the same as the concentration (g/m$^2$) of enhancers in the enhancement layer 400 formed on the first outer filtration surface 210 and/or the second outer filtration surface 220. It is also to be understood that the weight percentage (as compared to the weight of the air filter 200) of enhancers in the enhancement layer 400 formed on the inner filtration surface 230 may or may not be the same as the weight percentage (as compared to the weight of the air filter 200) of enhancers in the enhancement layer 400 formed on the first outer filtration surface 210 and/or the second outer filtration surface 220.

In another example embodiment illustrated in at least FIG. 3A and FIG. 3J, the enhancement layer 400 may be formed on at least a portion of the performance layer 300 (which may be formed on the first outer filtration surface 210 and/or the second outer filtration surface 220 and/or the inner filtration surface 230). The enhancement layer 400 formed on the performance layer 300 may be formed in such a way as to include between about 0.0001-50 g/m$^2$ of enhancers. In preferred embodiments, the enhancement layer 400 formed on the performance layer 300 includes between about 0.001-10 g/m$^2$ of enhancers Enhancers present in the enhancement layer 400 formed on the performance layer 300 may include, but are not limited to, one or more of the following: $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue. In example embodiments, a wet weight of the enhancement layer 400 (e.g., weight or weight percentage of the liquid (or wet) enhancement solution applied (but not yet dried) to form the enhancement layer 400) formed on the performance layer 300 is between about 0.1 to 200% of a weight of the air filter 200. In preferred embodiments, a wet weight of the enhancement layer 400 formed on the performance layer 300 is between about 30 to 50% of a weight of the air filter 200.

The enhancement layer 400 may be formed using an enhancement solution, or the like. In an example embodiment, the enhancement solution may include a composition of one or more of the following: 0.001 to 20% of $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue. In preferred embodiments, the enhancement solution may include a composition of one or more of the following: 0.5 to 10% of $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue. The enhancement layer 400 may be formed in one or more ways including, but not limited to, spraying the enhancement solution onto one or more surfaces of the air filter 200 and/or the performance layer 300; dipping the air filter 200 into the enhancement solution; brushing the enhancement solution onto the one or more surfaces of the air filter 200 and/or the performance layer 300; dipping the air filter 200 into the enhancement solution and spraying the enhancement solution; brushing the enhancement solution onto the one or more surfaces of the air filter 200 and/or the performance layer 300 and spraying the enhancement solution; and/or dipping the air filter 200 into the enhancement solution and brushing the enhancement solution onto the one or more surfaces of the air filter 200 and/or the performance layer 300.

Hybrid Layer (e.g., Hybrid Layer 500).

In an example embodiment, the disinfectant coating 500 may include one or more hybrid layers (e.g., hybrid layer 500). The hybrid layer 500 may be formed on one or more portions of the air filter 200 (and/or the performance layer 300 and/or the enhancement layer 400). As will be further described in the present disclosure, the hybrid layer 500 includes metal ions, carbonates, enhancers, alkaline, or the like. It is recognized in the present disclosure that the enhancers in the hybrid layer 500 (including metal ions and enhancers therein) are effective in, among other things, decomposing lipid molecules of bacteria and/or viruses, thereby helping, accelerating, enhancing, or the like, the metal ions in penetrating, destroying, rupturing, or the like, the cell walls of the bacteria and/or viruses, thereby destroying cell synthesis activity in such a way that the cells of the bacteria and/or viruses lose their ability to divide and proliferate (and die, achieving the effect of sterilization).

As illustrated in at least FIG. 3C, FIG. 3D, FIG. 3E, and FIG. 3L, an example embodiment of the hybrid layer 500 may be formed on one or more portions of the first outer filtration surface 210 of the air filter 200. The hybrid layer 500 formed on the first outer filtration surface 210 may be formed in such a way as to include between about 0.00001 to 0.5 g/m$^2$ of metal ions and between about 0.0001-50 g/m$^2$ of carbonates (or other enhancers). In preferred embodiments, the hybrid layer 500 formed on the first outer filtration surface 210 includes between about 0.001 to 0.01 g/m$^2$ of metal ions and between about 0.001-10 g/m$^2$ of enhancers. Metal ions present in the hybrid layer 500 formed on the first outer filtration surface 210 may include, but are not limited to, one or more of the following: silver (Ag) ions, copper (Cu) ions, zinc (Zn) ions, cobalt (Co) ions, tin (Sn) ions, iodine (I) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions. Enhancers present in the hybrid layer 500 formed on the first outer filtration surface 210 may include, but are not limited to, one or more of the following: $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue. In example embodiments, a wet weight of the hybrid layer 500 (e.g., weight or weight percentage of the liquid (or wet) enhancement and performance solutions applied (but not yet dried) to form the hybrid layer 500) formed on the first outer filtration surface 210 is between about 0.1 to 400% of a weight of the air filter 200. In preferred embodiments, a wet weight of the hybrid layer 500 formed on the first outer filtration surface 210 is between about 60 to 100% of a weight of the air filter 200.

Alternatively or in addition, the hybrid layer 500 may be formed on one or more portions of the second outer filtration surface 220 of the air filter 200. The hybrid layer 500 formed on the second outer filtration surface 220 may be formed in such a way as to include between about 0.00001 to 0.5 g/m$^2$ of metal ions and between about 0.0001-50 g/m$^2$ of carbonates (or other enhancers). In preferred embodiments, the hybrid layer 500 formed on the first outer filtration surface 210 includes between about 0.001 to 0.01 g/m$^2$ of metal ions and between about 0.001-10 g/m$^2$ of enhancers. Metal ions present in the hybrid layer 500 formed on the second outer filtration surface 220 may include, but are not limited to, one or more of the following: silver (Ag) ions, copper (Cu) ions, zinc (Zn) ions, cobalt (Co) ions, tin (Sn) ions, iodine (I) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions Enhancers present in the hybrid layer 500 formed on the second outer filtration surface 220 may include, but are not limited to, one or more of the following: $Na_2CO_3$, $K_2CO_3$, $(NH_4)_2CO_3$, NaOH, KOH, Ba(OH)$_2$, CsOH, Sr(OH)$_2$, Ca(OH)$_2$, LiOH, RbOH, Rose Bengal, Methylene Blue, and/or Eosin Blue. In example embodiments, a wet weight of the hybrid layer 500 (e.g., weight or weight percentage of the liquid (or wet) enhancement and performance solutions applied (but not yet dried) to form the hybrid layer 500) formed on the second outer filtration surface 220 is between about 0.1 to 400% of a weight of the air filter 200. In preferred embodiments, a wet weight of the hybrid layer 500 formed on the second outer filtration surface 220 is between about 60 to 100% of a weight of the air filter 200. Alternatively, in example embodiments where the hybrid layer 500 is also formed on the first outer filtration surface 210 and/or inner filtration surface 230, a collective wet weight of the hybrid layer 500 (e.g., weight or weight percentage of the liquid (or wet) enhancement and performance solutions applied (but not yet dried) to form the hybrid layer 500) may be between about 0.1 to 400% of a weight of the air filter 200. In preferred embodiments where the hybrid layer 500 is also formed on the first outer filtration surface 210 and/or inner filtration surface 230, a collective wet weight of the hybrid layer 500 may be between about 60 to 100% of a weight of the air filter 200. It is to be understood that the metal ions and/or enhancers present in the hybrid layer 500 formed on the second outer filtration surface 220 may or may not be the same as the metal ions and/or enhancers present in the hybrid layer 500 formed on the first outer filtration surface 210 and/or the inner filtration surface 230. It is also to be understood that the concentration (g/m$^2$) of metal ions and/or enhancers in the hybrid layer 500 formed on the second outer filtration surface 220 may or may not be the same as the concentration (g/m$^2$) of metal ions and/or enhancers in the hybrid layer 500 formed on the first outer filtration surface 210 and/or the inner filtration surface 230. It is also to be understood that the weight percentage (as compared to the weight of the air filter 200) of metal ions and/or enhancers in the hybrid layer 500 formed on the second outer filtration surface 220 may or may not be the same as the weight percentage (as compared to the weight of the air filter 200) of metal ions and/or enhancers in the hybrid layer 500 formed on the first outer filtration surface 210 and/or the inner filtration surface 230.

In example embodiments, the hybrid layer 500 may be formed on one or more portions of the inner filtration surface 230. The hybrid layer 500 formed on the inner filtration surface 230 may be formed in such a way as to include between about 0.00001 to 0.5 g/m$^2$ of metal ions and between about 0.0001-50 g/m$^2$ of carbonates (or other enhancers). In preferred embodiments, the hybrid layer 500 formed on the inner filtration surface 230 includes between about 0.001 to 0.01 g/m$^2$ of metal ions and between about 0.001-10 g/m$^2$ of enhancers. Metal ions present in the hybrid layer 500 formed on the inner filtration surface 230 may include, but are not limited to, one or more of the following: silver (Ag) ions, copper (Cu) ions, zinc (Zn) ions, cobalt (Co) ions, tin (Sn) ions, iodine (I) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions. Enhancers present in the hybrid layer 500 formed on the inner filtration surface 230 may include, but are not limited to, one or more of the following: Na$_2$CO$_3$, K$_2$CO$_3$, (NH$_4$)$_2$CO$_3$, NaOH, KOH, Ba(OH)$_2$, CsOH, Sr(OH)$_2$, Ca(OH)$_2$, LiOH, RbOH, Rose Bengal, Methylene Blue, and/or Eosin Blue. In example embodiments, a wet weight of the hybrid layer 500 (e.g., weight or weight percentage of the liquid (or wet) enhancement and performance solutions applied (but not yet dried) to form the hybrid layer 500) formed on the inner filtration surface 230 is between about 0.1 to 400% of a weight of the air filter 200. In preferred embodiments, a wet weight of the hybrid layer 500 formed on the inner filtration surface 230 is between about 60 to 100% of a weight of the air filter 200. Alternatively, in example embodiments where the hybrid layer 500 is also formed on the first outer filtration surface 210 and/or second outer filtration surface 220, a collective wet weight of the hybrid layer 500 (e.g., weight or weight percentage of the liquid (or wet) enhancement and performance solutions applied (but not yet dried) to form the hybrid layer 500) may be between about 0.1 to 400% of a weight of the air filter 200. In preferred embodiments where the hybrid layer 500 is also formed on the first outer filtration surface 210 and/or second outer filtration surface 220, a collective wet weight of the hybrid layer 500 may be between about 60 to 100% of a weight of the air filter 200. It is to be understood that the metal ions and/or enhancers present in the hybrid layer 500 formed on the inner filtration surface 230 may or may not be the same as the metal ions and/or enhancers present in the hybrid layer 500 formed on the first outer filtration surface 210 and/or the second outer filtration surface 220. It is also to be understood that the concentration (g/m$^2$) of metal ions and/or enhancers in the hybrid layer 500 formed on the inner filtration surface 230 may or may not be the same as the concentration (g/m$^2$) of metal ions and/or enhancers in the hybrid layer 500 formed on the first outer filtration surface 210 and/or the second outer filtration surface 220. It is also to be understood that the weight percentage (as compared to the weight of the air filter 200) of metal ions and/or enhancers in the hybrid layer 500 formed on the inner filtration surface 230 may or may not be the same as the weight percentage (as compared to the weight of the air filter 200) of metal ions and/or enhancers in the hybrid layer 500 formed on the first outer filtration surface 210 and/or the second outer filtration surface 220.

The hybrid layer 500 may be formed using a performance solution, or the like, and an enhancement solution, or the like. In an example embodiment, the performance solution may include a composition of 0.0001 to 5% of one or more of the following: AgNO$_3$, Ag$_2$O, Ag$_2$SO$_4$, Ag$_2$S, AgCl, Ag$_2$CO$_3$, CuO, CuCO$_3$, CuSO$_4$, Cu(NO$_3$)$_2$, CuCl$_2$, ZnO, ZnCl$_2$, ZnS, ZnSO$_4$, Zn(NO$_3$)$_2$, ZnCO$_3$, and/or other soluble components that contain Co, Sn, I, Cr, Te, Ge, Bi, Sn, Pb, Cd, Ti, and/or Hg ions. In preferred embodiments, the performance solution may include a composition of 0.005 to 0.1% of one or more of the following: AgNO$_3$, Ag$_2$O, Ag$_2$SO$_4$, Ag$_2$S, AgCl, Ag$_2$CO$_3$, CuO, CuCO$_3$, CuSO$_4$, Cu(NO$_3$)$_2$, CuCl$_2$, ZnO, ZnCl$_2$, ZnS, ZnSO$_4$, Zn(NO$_3$)$_2$, ZnCO$_3$, and/or other soluble components that contain Co, Sn, I, Cr, Te, Ge, Bi, Sn, Pb, Cd, Ti, and/or Hg ions. In an example embodiment, the enhancement solution may include a composition of 0.001 to 20% of one or more of the following: Na$_2$CO$_3$, K$_2$CO$_3$, (NH$_4$)$_2$CO$_3$, NaOH, KOH, Ba(OH)$_2$, CsOH, Sr(OH)$_2$, Ca(OH)$_2$, LiOH, RbOH, Rose Bengal, Methylene Blue, and/or Eosin Blue. In preferred embodiments, the enhancement solution may include a composition of 0.5 to 10% of one or more of the following: Na$_2$CO$_3$, K$_2$CO$_3$, (NH$_4$)$_2$CO$_3$, NaOH, KOH, Ba(OH)$_2$, CsOH, Sr(OH)$_2$, Ca(OH)$_2$, LiOH, RbOH, Rose Bengal, Methylene Blue, and/or Eosin Blue. The hybrid layer 500 may be formed in one or more ways including, but not limited to, simultaneously or near-simultaneously spraying (and/or applying in other ways) the performance solution (e.g., from a first sprayer) and the enhancement solution (e.g., from a second sprayer) onto one or more surfaces of the air filter 200.

Example Embodiment of a System 100 Having a Folded Air Filter 200.

As illustrated in FIG. 3F, an example embodiment of the system 100 may include an air filter 200 formed with a plurality of folds (as described in the present disclosure). The system 100 may also include a performance layer 300 formed on a first outer filtration surface 210 of the air filter 200. The system 100 may also include a performance layer 300 formed on an inner filtration surface 230 of the air filter 200. Although not shown in FIG. 3F, the system 100 may also include a performance layer formed on a second outer filtration surface 220 of the air filter 200.

The system 100 may also include an enhancement layer 400 formed on one or more portions of the performance layer 300. For example, the enhancement layer 400 may be formed on the portion of the performance layer 300 that is formed on the first outer filtration surface 210 of the air filter 200. Alternatively or in addition, the enhancement layer 400 may be formed on the portion of the performance layer 300 that is formed on the inner filtration surface 230 of the air filter 200. Alternatively or in addition, the enhancement layer 400 may be formed on the portion of the performance layer 300 that is formed on the second outer filtration surface 220 of the air filter 200 (if the performance layer 300 is indeed formed on the second outer filtration surface 220 of the air filter 200).

Example Embodiments of a System 100 Having a Layered Air Filter 200.

As illustrated in FIG. 3G, an example embodiment of the system 100 may include an air filter 200 having a plurality of filtration layers (as described in the present disclosure). The system 100 may also include a performance layer 300 formed on a first outer filtration surface 210 of the air filter 200. As illustrated in FIG. 3H, the system 100 may also include a performance layer 300 formed on one or more of the inner filtration surfaces 230 of the air filter 200. Although not shown in FIGS. 3G and 3H, the system 100 may also include a performance layer formed on a second outer filtration surface 220 of the air filter 200.

The system 100 may also include an enhancement layer 400 formed on one or more portions of the performance layer 300. For example, the enhancement layer 400 may be formed on the portion of the performance layer 300 that is formed on the first outer filtration surface 210 of the air filter 200. Alternatively or in addition, the enhancement layer 400 may be formed on the portion of the performance layer 300 that is formed on the inner filtration surface 230 of the air filter 200. Alternatively or in addition, the enhancement layer 400 may be formed on the portion of the performance layer 300 that is formed on the second outer filtration surface 220 of the air filter 200 (if the performance layer 300 is indeed formed on the second outer filtration surface 220 of the air filter 200).

Example Embodiments of a Method for Forming an Air Filtration System (e.g., Method 600).

Figure 4:
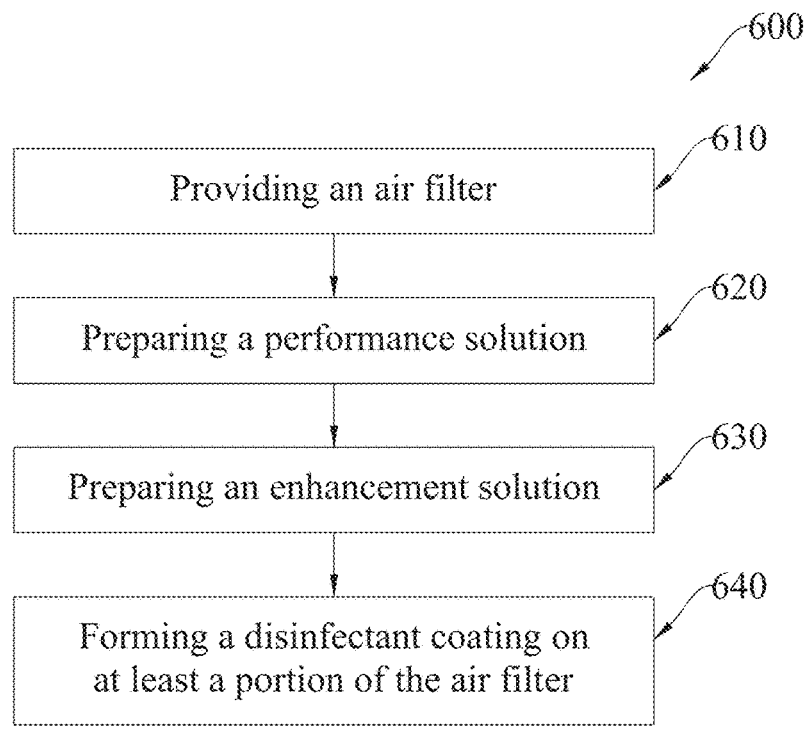
FIG. 4 illustrates an example embodiment of a method of forming an air filtration system.

As illustrated in FIG. 4, an example embodiment of a method (e.g., method 600) of forming an air filtration system includes providing an air filter (e.g., action 610). The method 600 of forming an air filtration system also includes preparing a performance solution (e.g., action 620). The method 600 of forming an air filtration system also includes preparing an enhancement solution (e.g., action 630). The method 600 of forming an air filtration system also includes forming a disinfectant coating on at least a portion of the air filter (e.g., action 640).

Example embodiments of the method 600 of forming an air filtration system, and actions thereof, will now be further described with reference to the accompanying figures, which form a part of the present disclosure.

Providing an Air Filter (e.g., Action 610).

In an Example Embodiment, the Method 600 of Forming an Air Filtration System (e.g., System 100) includes providing one or more air filters (e.g., air filter 200) (e.g., action 610). Each air filter 200 may be or include one or more example embodiments of the air filters 200 described above and in the present disclosure. For example, the air filter 200 may be a substantially planar air filter, as illustrated in at least FIG. 2A. The air filter 200 may also be an air filter 200 having one or more folded portions, as illustrated in at least FIG. 2C. The air filter 200 may also be or include a plurality of air filters stacked or layered together, as illustrated in at least FIG. 2D. The air filter 200 may also be or include a plurality of fibers, as illustrated in at least FIG. 2E. It is to be understood that other shapes, sizes, dimensions, forms, and/or configurations of air filters 200 are also contemplated without departing from the teachings of the present disclosure.

Preparing a Performance Solution (e.g., Action 620).

In an example embodiment, the method 600 of forming an air filtration system (e.g., system 100) includes preparing a performance solution (e.g., action 620). In an example embodiment, the performance solution may include a composition of 0.0001 to 50% of one or more of the following: $AgNO_3$, $Ag_2O$, $Ag_2SO_4$, $Ag_2S$, $AgCl$, $Ag_2CO_3$, $CuO$, $CuCO_3$, $CuSO_4$, $Cu(NO_3)_2$, $CuCl_2$, $ZnO$, $ZnCl_2$, $ZnS$, $ZnSO_4$, $Zn(NO_3)_2$, $ZnCO_3$, and/or other soluble components that contain Co, Sn, I, Cr, Te, Ge, Bi, Sn, Pb, Cd, Ti, and/or Hg ions. In preferred embodiments, the performance solution may include a composition of 0.005 to 0.1% of one or more of the following: $AgNO_3$, $Ag_2O$, $Ag_2SO_4$, $Ag_2S$, $AgCl$, $Ag_2CO_3$, $CuO$, $CuCO_3$, $CuSO_4$, $Cu(NO_3)_2$, $CuCl_2$, $ZnO$, $ZnCl_2$, $ZnS$, $ZnSO_4$, $Zn(NO_3)_2$, $ZnCO_3$, and/or other soluble components that contain Co, Sn, I, Cr, Te, Ge, Bi, Sn, Pb, Cd, Ti, and/or Hg ions.

In example embodiments where the performance layer (e.g., performance layer 300) will be formed by spraying, the preparing of the performance solution may also include providing the performance solution in a sprayer, or the like.

The performance layer 300 formed by the performance solution is effective in, among other things, contacting and reacting with bacteria cells, and in doing so causes the destruction or dysfunction of bacterial components. When metal ions of the performance layer 300 reach the cell wall, the cell wall becomes negatively charged and, relying on Coulomb attraction, the metal ions become firmly adsorbed or attached to the cell wall. The metal ions of the performance layer 300 are then operable to penetrate the cell wall and destroy cell synthesis activity. Accordingly, cells lose their ability to divide and proliferate, and die. Furthermore, the metal ions in the performance layer 300 are operable to damage the microbial electronic transmission system, respiratory system and material transmission system. In terms of viruses, the metal ions in the performance layer 300 are operable to mechanically adsorb and attach to the virus, react with the virus surface protein, inactivate the enzyme protein, and bind with the viral nucleic acid.

Preparing an Enhancement Solution (e.g., Action 630).

In an example embodiment, the method 600 of forming an air filtration system (e.g., system 100) includes preparing an enhancement solution (e.g., action 630). In an example embodiment, the enhancement solution may include a composition of 0.001 to 20% of $Na_2CO_3$, $K_2CO_3$, $(NH_4)_2CO_3$, $NaOH$, $KOH$, $Ba(OH)_2$, $CsOH$, $Sr(OH)_2$, $Ca(OH)_2$, $LiOH$, $RbOH$, Rose Bengal, Methylene Blue, and/or Eosin Blue. In preferred embodiments, the enhancement solution may include a composition of 0.5 to 10% of $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, RbOH, Rose Bengal, Methylene Blue, and/or Eosin Blue.

In example embodiments where the enhancement layer (e.g., enhancement layer 400) will be formed by spraying, the preparing of the performance solution may also include providing the performance solution in a sprayer, or the like. Forming a Disinfectant Coating on at Least a Portion of the Air Filter (e.g., Action 640).

In an example embodiment, the method 600 of forming an air filtration system (e.g., system 100) includes forming a disinfectant coating (e.g., disinfectant coating 500, as described in the present disclosure) on at least a portion of the air filter (e.g., air filter 200, as described in the present disclosure) (e.g., action 640). The disinfectant coating 500 may be formed in one or more of a plurality of ways.

Figure 5A:
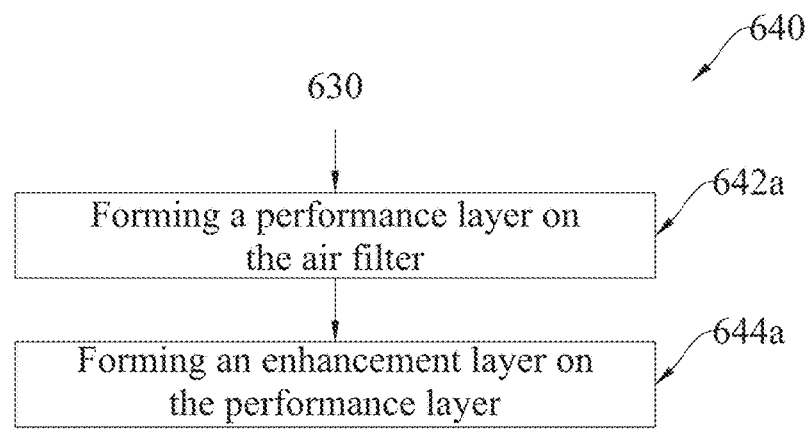
FIG. 5A illustrates an example embodiment of a method of forming a disinfectant coating on at least a portion of the air filter.

For example, as illustrated in FIG. 5A, the disinfectant coating 500 may be formed by forming a performance layer (e.g., performance layer 300, as described in the present disclosure) on the air filter 200 (e.g., action 642a). As described in the present disclosure, the performance layer 300 may be formed on a first outer filtration surface 210 of the air filter 200. Alternatively or in addition, the performance layer 300 may be formed on a second outer filtration surface 220 of the air filter 200. Alternatively or in addition, the performance layer 300 may be formed on an inner filtration surface 230 of the air filter 200. The forming of the disinfectant coating 500 may further include forming an enhancement layer (e.g., enhancement layer 400, as described in the present disclosure) on the performance layer 300 that has already been formed on the air filter 200 (e.g., action 644a). As described in the present disclosure, the enhancement layer 400 may be formed on the performance layer 300 that has been formed on the first outer filtration surface 210 of the air filter 200. Alternatively or in addition, the enhancement layer 400 may be formed the performance layer 300 that has been formed on the second outer filtration surface 220 of the air filter 200. Alternatively or in addition, the enhancement layer 400 may be formed on the performance layer 300 that has been formed on the inner filtration surface 230 of the air filter 200.

Figure 5B:
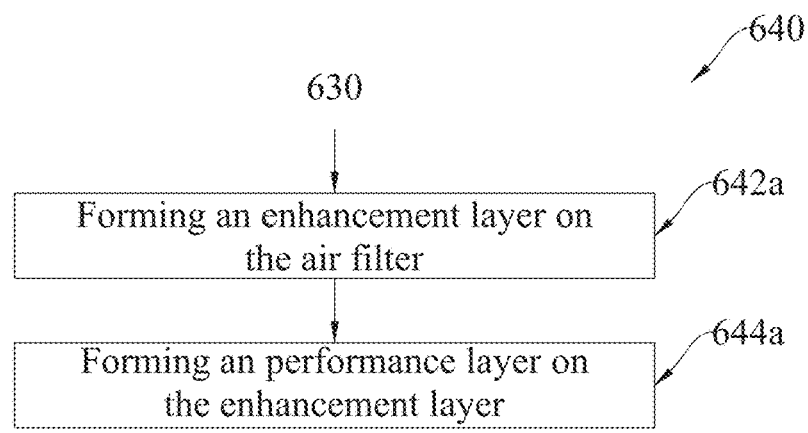
FIG. 5B illustrates another example embodiment of a method of forming a disinfectant coating on at least a portion of the air filter.

As another example, as illustrated in FIG. 5B, the disinfectant coating 500 may be formed by forming an enhancement layer 400 on the air filter 200 (e.g., action 642b). As described in the present disclosure, the enhancement layer 400 may be formed on a first outer filtration surface 210 of the air filter 200. Alternatively or in addition, the enhancement layer 400 may be formed on a second outer filtration surface 220 of the air filter 200. Alternatively or in addition, the enhancement layer 400 may be formed on an inner filtration surface 230 of the air filter 200. The forming of the disinfectant coating 500 may further include forming a performance layer 300 on the enhancement layer 400 that has already been formed on the air filter 200 (e.g., action 644b). As described in the present disclosure, the performance layer 300 may be formed on the enhancement layer 400 that has been formed on the first outer filtration surface 210 of the air filter 200. Alternatively or in addition, the performance layer 300 may be formed the enhancement layer 400 that has been formed on the second outer filtration surface 220 of the air filter 200. Alternatively or in addition, the performance layer 300 may be formed the enhancement layer 400 that has been formed on the inner filtration surface 230 of the air filter 200.

Figure 5C:
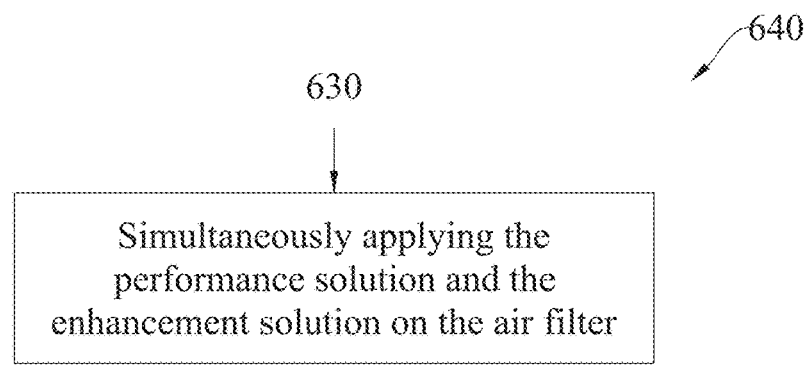
FIG. 5C illustrates another example embodiment of a method of forming a disinfectant coating on at least a portion of the air filter.

In yet another example, as illustrated in FIG. 5C, the disinfectant coating 500 may be formed by simultaneously or near-simultaneously applying the performance solution and the enhancement solution on the air filter 200 so as to form a hybrid layer (e.g., hybrid layer 500, as described in the present disclosure). The simultaneous or near-simultaneous applying may be achieved by simultaneously or near-simultaneously spraying (and/or applying in other ways) the performance solution (e.g., from a first sprayer) and the enhancement solution (e.g., from a second sprayer) onto one or more surfaces of the air filter 200. It is recognized in the present disclosure that separating the performance solution and the enhancement solution in separate sprayers/containers (i.e., without mixing) and separately spraying them onto the air filter 200 can reduce chemical reactions between the performance solution (including the metal ions therein) and the enhancement solution (including the enhancers therein) that would result from such mixing, thereby reducing or eliminating precipitates forming prior to spraying (which would otherwise clog or make difficult the spraying process.

The enhancement layer 400 formed by the enhancement solution is effective in, among other things, decomposing lipid molecules of bacteria and/or viruses, thereby helping, accelerating, enhancing, or the like, the performance layer 300 (including metal ions therein) in penetrating, destroying, rupturing, or the like, the cell walls of the bacteria and/or viruses, thereby destroying cell synthesis activity in such a way that the cells of the bacteria and/or viruses lose their ability to divide and proliferate (and die, achieving the effect of sterilization).

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art" depends on the context in which that term is used. Terms are to be construed in light of the context in which they are used in the present disclosure and as one of ordinary skill in the art would understand those terms in the disclosed context. Definitions provided herein are not exclusive of other meanings that might be imparted to those terms based on the disclosed context.

Words of comparison, measurement, and timing such as "at the time", "equivalent", "during", "complete", and the like should be understood to mean "substantially at the time", "substantially equivalent", "substantially during", "substantially complete", etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An air filtration assembly, the air filtration assembly comprising:
    an air filter, the air filter having a plurality of filtration surfaces, including a first outer filtration surface, a second outer filtration surface opposite to the first outer filtration surface, and one or more inner filtration surfaces provided between the first and second outer filtration surfaces, the plurality of filtration surfaces configured to trap one or more airborne particulates, including viruses and/or bacteria; and
    a disinfectant coating, the disinfectant coating formed on at least a portion of the plurality of filtration surfaces, the disinfectant coating for use in disinfecting trapped airborne particulates, the disinfectant coating including:
        a first performance layer section formed directly on a first section of each of the plurality of filtration surfaces, the first performance layer section including metal ions;
        a first enhancement layer section formed directly on a second section of each of the plurality of filtration surfaces, the first enhancement layer section including carbonates;
        a second performance layer section formed directly on a third section of each of the plurality of filtration surfaces, the second performance layer section including metal ions;
        a second enhancement layer section formed directly on the second performance layer section, the second enhancement layer section including carbonates;
        a third enhancement layer section formed directly on a fourth section of each of the plurality of filtration surfaces, the third enhancement layer section including carbonates, wherein the first, second, third, and fourth sections of each of the plurality of filtration surfaces are different sections of each of the plurality of filtration surfaces; and
        a third performance layer section formed directly on the third enhancement layer section, the third performance layer section including metal ions.

2. The air filtration assembly of claim 1, wherein one or more of the following apply:
    each of the first and second performance layer sections include between 0.00001 to 0.5 g/m$^2$ of metal ions; and/or
    each of the first and second enhancement layer sections include between 0.0001-50 g/m$^2$ of carbonates.

3. The air filtration assembly of claim 1, wherein one or more of the following apply:
    each of the first and second performance layer sections include between 0.001 to 0.01 g/m$^2$ of metal ions;
    each of the first and second the enhancement layer sections include between 0.001-10 g/m$^2$ of carbonates.

4. The air filtration assembly of claim 1, wherein one or more of the following apply:
    a wet weight of all performance layer sections of the disinfectant coating, including the first, second, and third performance layer sections, is between 0.1 to 200% of a weight of the air filter; and/or
    a wet weight of all enhancement layer sections of the disinfectant coating, including the first, second, and third enhancement layer sections, is between 0.1 to 200% of a weight of the air filter.

5. The air filtration assembly of claim 1, wherein one or more of the following apply:
    a wet weight of all performance layer sections of the disinfectant coating, including the first, second, and third performance layer sections, is between 30 to 50% of a weight of the air filter; and/or
    a wet weight of all enhancement layer sections of the disinfectant coating, including the first, second, and third enhancement layer sections, is between 30 to 50% of a weight of the air filter.

6. The air filtration assembly of claim 1, wherein one or more of the following apply:
    the metal ions in each of the first and second performance layer sections are one or more of the following metal ions: silver (Ag) ions, copper (Cu) ions, zinc (Zn) ions, cobalt (Co) ions, tin (Sn) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions; and/or
    each of the first and second the enhancement layer sections includes one or more of the following enhancers: $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, and RbOH; and/or
    each of the first and second enhancement layer sections is configured to enhance the disinfecting effectiveness of the performance layer.

7. An air filtration assembly, the air filtration assembly comprising:
    an air filter, the air filter having a plurality of filtration surfaces, including a first outer filtration surface, a second outer filtration surface opposite to the first outer filtration surface, and one or more inner filtration surfaces provided between the first and second outer filtration surfaces, the plurality of filtration surfaces configured to trap one or more airborne particulates, including viruses and/or bacteria; and
    a disinfectant coating, the disinfectant coating formed on the air filter, the disinfectant coating including a hybrid layer of metal ions formed directly on a first section of the air filter, carbonates formed directly on a second section of the air filter, metal ions formed directly on a third section of the air filter, carbonates formed directly on the metal ions that are formed directly on the third section of the air filter, carbonates formed directly on a fourth section of the air filter, and metal ions formed directly on the carbonates that are formed directly on the fourth section of the air filter, the first, second, third, and fourth sections of the air filter being different sections of the air filter, wherein the disinfectant coating includes between 0.00001 to 0.5 g/m$^2$ of metal ions formed on at least one of the first and third sections of the air filter, wherein the disinfectant coating includes between 0.0001-50 g/m$^2$ of carbonates formed on at least one of the second and fourth sections of the air filter.

8. The air filtration assembly of claim 7, wherein one or more of the following apply:

the disinfectant coating formed on the first and third sections of the air filter include between 0.001 to 0.01 $g/m^2$ of metal ions; and/or the disinfectant coating formed on the second and third sections of the air filter include between 0.001-50 $g/m^2$ of carbonates.

9. The air filtration assembly of claim 7, wherein one or more of the following apply:

a collective wet weight of all metal ions in the disinfectant coating, including the metal ions formed over the first, third, and fourth sections of the air filter, is between 0.1 to 200% of a weight of the air filter; and/or a collective wet weight of all carbonates in the disinfectant coating, including the carbonates formed over the second, third, and fourth sections of the air filter, is between 0.1 to 200% of the weight of the air filter.

10. The air filtration assembly of claim 7, wherein one or more of the following apply:

a collective wet weight of all metal ions in the disinfectant coating, including the metal ions formed over the first, third, and fourth sections of the air filter, is between 30 to 50% of a weight of the air filter; and/or a collective wet weight of all carbonates in the disinfectant coating, including the carbonates formed over the second, third, and fourth sections of the air filter, is between 30 to 50% of the weight of the air filter.

11. The air filtration assembly of claim 7, wherein one or more of the following apply:

the metal ions in the disinfectant coating, including the metal ions formed over at least one of the first, third, and fourth sections of the air filter, is one or more of the following metal ions: silver (Ag) ions, copper (Cu) ions, zinc (Zn) ions, cobalt (Co) ions, tin (Sn) ions, chromium (Cr) ions, tellurium (Te) ions, germanium (Ge) ions, bismuth (Bi) ions, lead (Pb) ions, cadmium (Cd) ions, titanium (Ti) ions, and mercury (Hg) ions; and/or the carbonates in the disinfectant coating, including the carbonates formed over at least one of the second, third, and fourth sections of the air filter, includes one or more of the following enhancers: $Na_2CO_3$, $K_2CO_3$, $(NH_4)_2CO_3$, NaOH, KOH, $Ba(OH)_2$, CsOH, $Sr(OH)_2$, $Ca(OH)_2$, LiOH, and RbOH.

* * * * *